Feb. 5, 1952  A. G. THOMAS  2,584,641
GROUND SPEED INDICATOR
Filed April 5, 1949   6 Sheets-Sheet 1

INVENTOR
Albert G. Thomas

Feb. 5, 1952   A. G. THOMAS   2,584,641
GROUND SPEED INDICATOR
Filed April 5 1949   6 Sheets-Sheet 2

INVENTOR
Albert G. Thomas

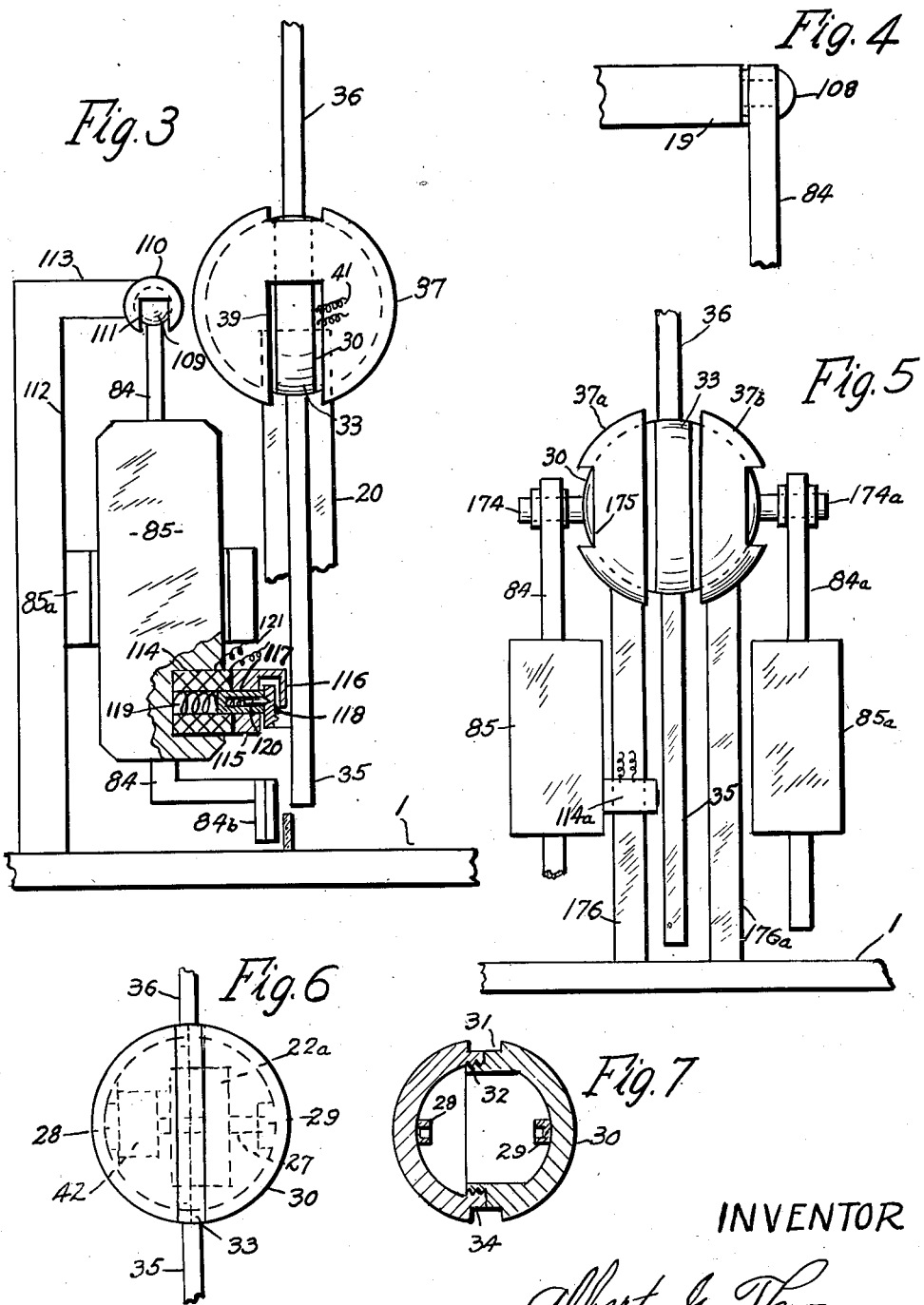

Feb. 5, 1952  A. G. THOMAS  2,584,641
GROUND SPEED INDICATOR
Filed April 5, 1949  6 Sheets-Sheet 4
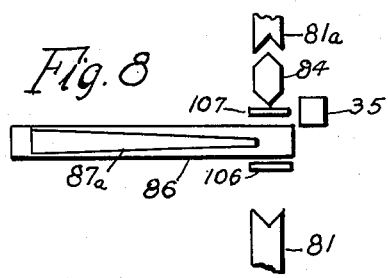
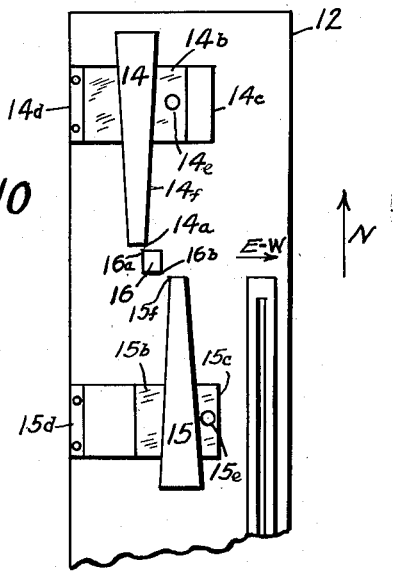
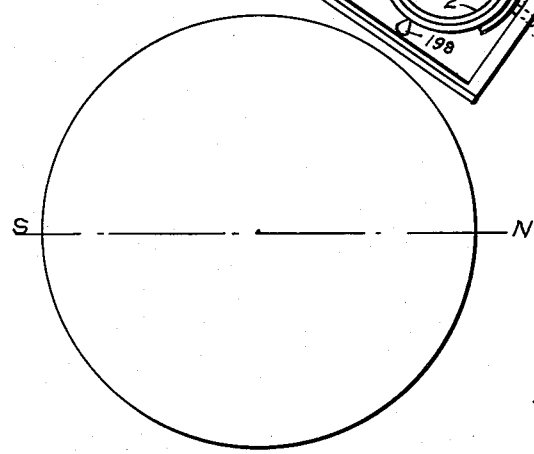
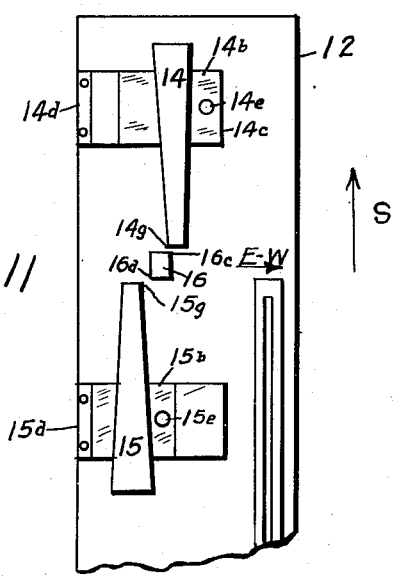
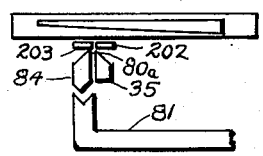
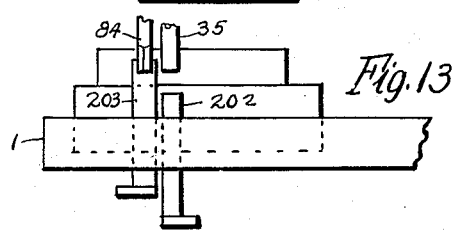
Albert G. Thomas  INVENTOR.

Feb. 5, 1952   A. G. THOMAS   2,584,641
GROUND SPEED INDICATOR

Filed April 5, 1949   6 Sheets-Sheet 5

Albert G. Thomas INVENTOR.

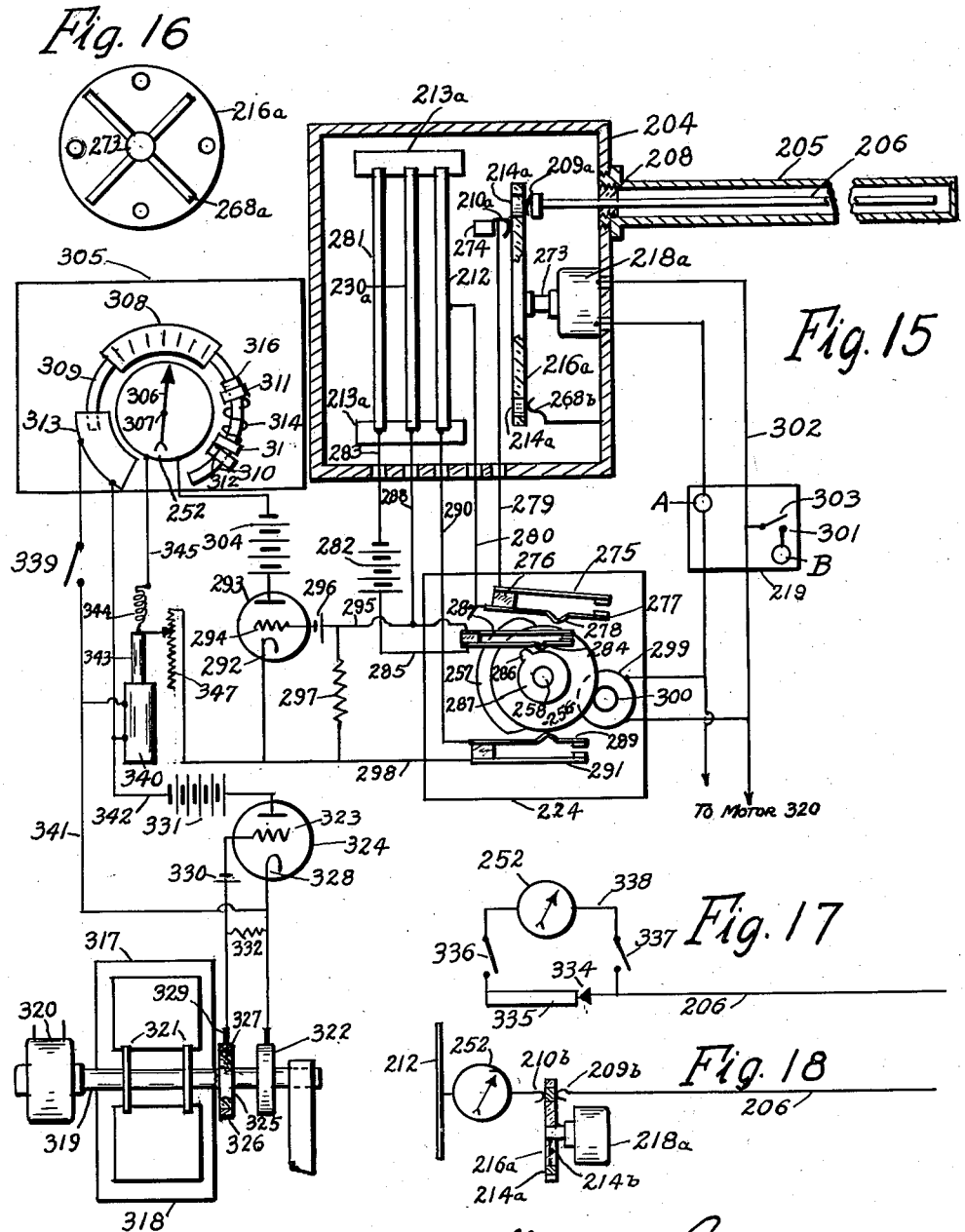

Patented Feb. 5, 1952

2,584,641

UNITED STATES PATENT OFFICE 2,584,641

GROUND SPEED INDICATOR

Albert G. Thomas, Lynchburg, Va.

Application April 5, 1949, Serial No. 85,581

14 Claims. (Cl. 264—1)

This invention relates to instruments generally and particularly to ground speed indicators for aircraft.

It has long been a problem to provide a ground speed indicator for airplanes and other aircraft, and which will be accurate, simple to operate, and not requiring the operator to see the ground, which term also includes bodies of water such as the sea. It has also been a problem to provide aircraft with a reliable gyroscopic compass since known gyroscopic compasses tend to veer from true indications in a relatively short time.

An object is, therefore, to provide an instrument for aircraft or other vehicles for indicating true speed of the aircraft relative to ground, even though the ground is not visible.

Another object is to provide an instrument for aircraft or other vehicles for indicating true direction of flight or travel.

An additional object is to provide a ground speed indicator which also shows drift.

Additional objects will be evident in the following description.

In the drawings:

Figure 3 is a fragmentary elevation, in part section, of a gyroscope and plumb bob mounting suitable for use in the device of Figures 1 and 2.

Figure 4 is a fragmentary elevation of another plumb bob mounting suitable for use with the device shown in Figures 1 and 2.

Figure 5 is a front elevation, with parts broken away, of a balanced plumb bob mounting associated with a universal gyroscope mounting.

Figure 6 is an elevation of a spherical split shell holding a motor and gyroscope, showing associated rods broken away.

Figure 7 is a sectional view of a shell similar to that shown in Figure 6, showing the split threaded construction.

Figure 8 is a fragmentary top plan view, in part section of a modified cam construction, and showing associated elements.

Figure 9 is a side elevation showing a modified bearing for the outer bearing ring of Figs. 1 and 2, and indicating the inclination of plate 1 and several associated elements for flight at a latitude other than the equator.

Figure 10 is a fragmentary top plan view of the construction and setting of cams or wedges as shown in Fig. 1, for northward flight.

Figure 11 is a fragmentary top plan view showing the setting of the wedges of Fig. 10, for southward flight.

Figure 12 is a fragmentary top plan view showing a modified construction for the lower ends of plumb bob and gyroscope rods, and associated stops.

Figure 13 is a fragmentary rear elevation showing the stops of Figure 12 and supporting plate.

Figure 15 is a top plan view of a modified electrical ground speed indicator.

Figure 16 is a right face view of a contact disc used in the device shown in Figure 15.

Figure 17 is a diagrammatic sketch of another modification of the electrical ground speed indicator.

Figure 18 is a schematic illustration of still another modified electrical ground speed indicator.

Figure 1:
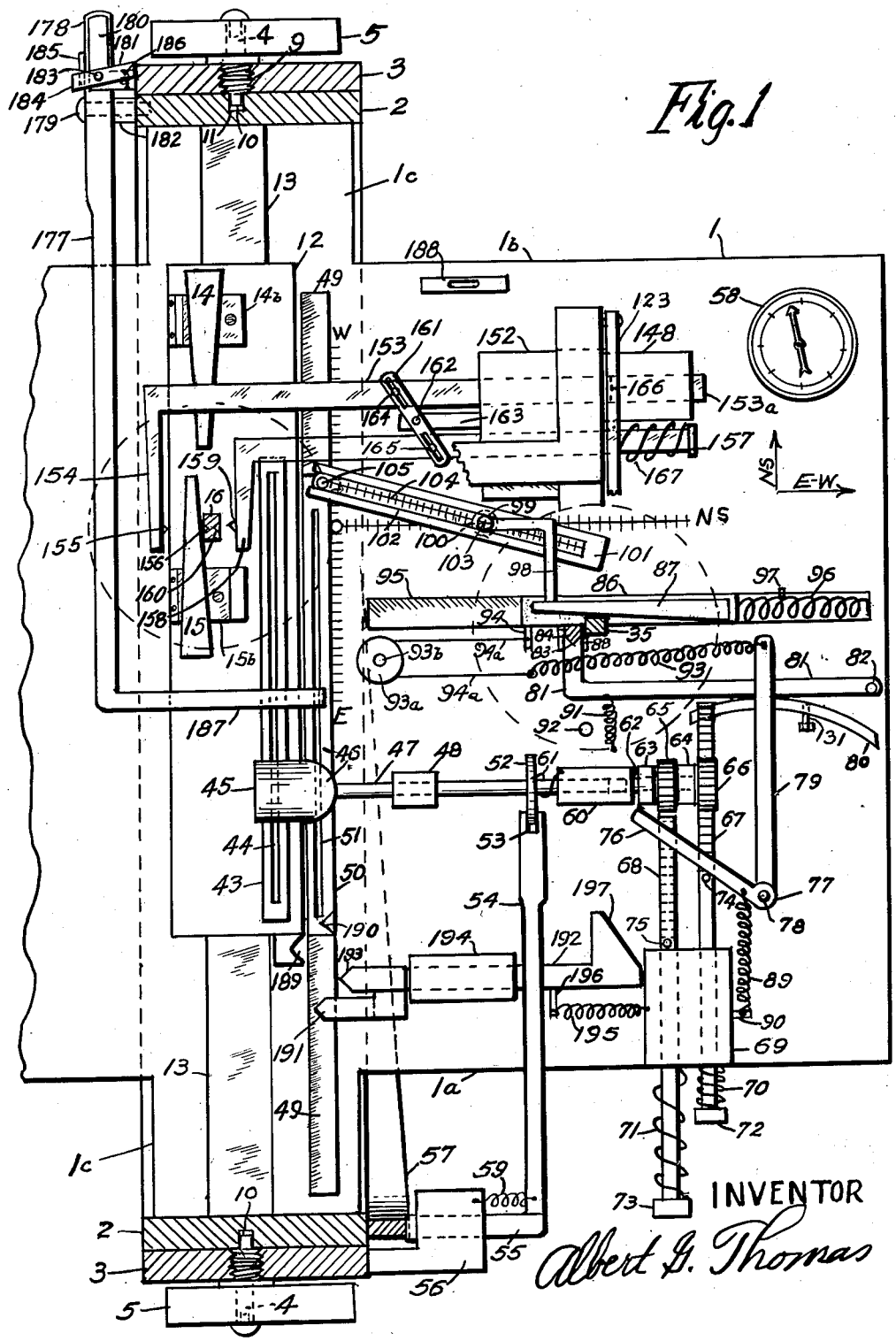
Figure 1 is a top plan view, in part section, of a ground speed indicator employing two gyroscopes and a pendulum or plumb bob. The gyroscopes are indicated by dotted circles and a base plate is shown broken away.
Figure 2:
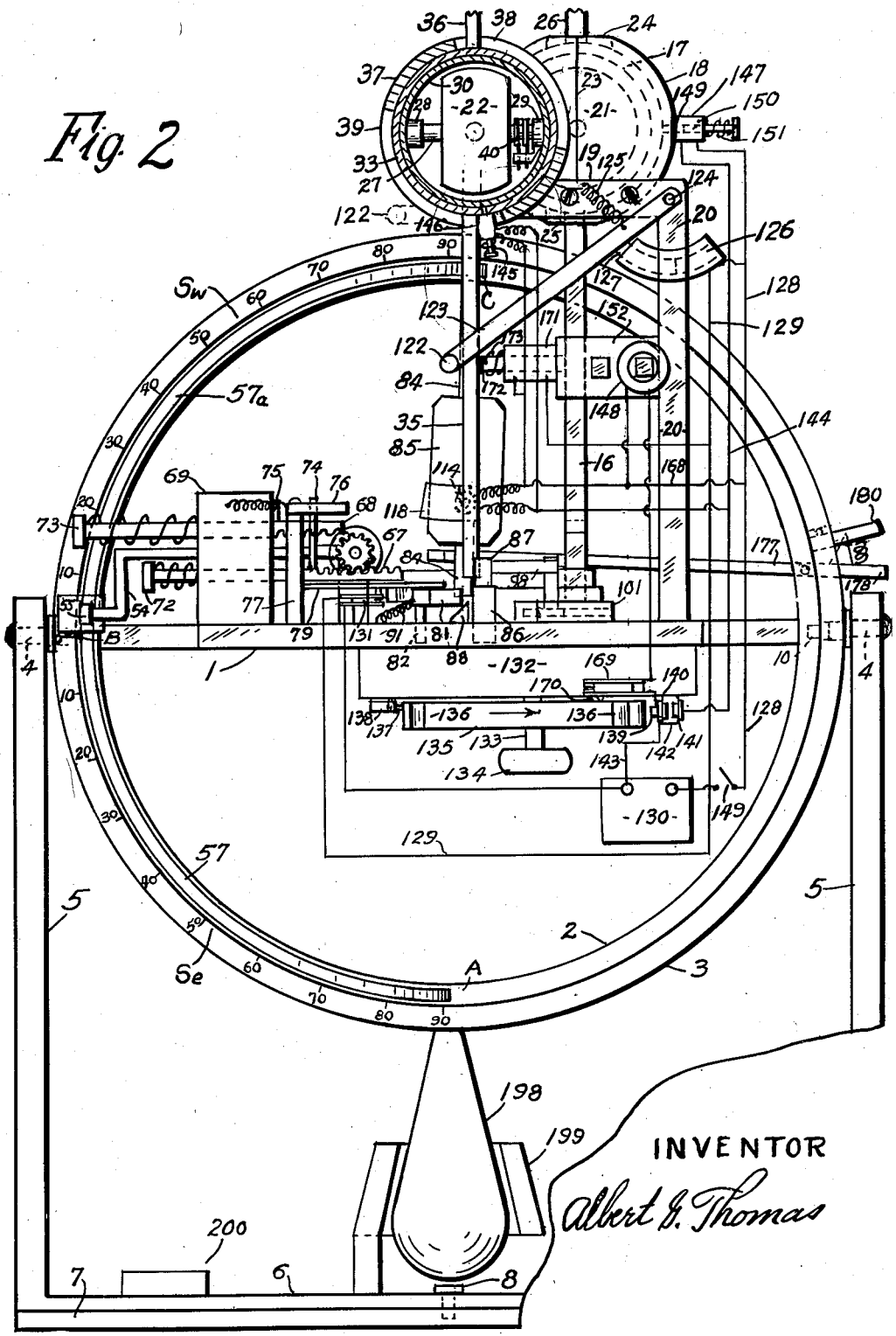
Figure 2 is a right side elevation, in part section, of the device shown in Figure 1.

In Figures 1 and 2 plate 1 is mounted centrally in circular ring 2 which is rotatable in outer bearing ring 3 which is rotatable about a horizontal axis including bolts 4 fitted into holes in vertical supporting legs 5 integral with horizontal upper base plate 6 which rests upon lower base plate 7 and can be rotated relative thereto around pivot 8 which passes through a central hole in plate 6 and is screwed into a threaded hole in plate 7. Bolts or pivot pins 4 have threaded portions 9 screwed into threaded openings in ring 3 and cylindrical bolt tips 10 are fitted into circumferential groove 11 around ring 2, to allow relative rotation of the rings but not relative axial displacement. Suitable washers are provided between posts 5 and ring 3 so that the latter can be rotated about pivots 4 through an angle relative to posts or legs 5.

Slide or carriage 12 is slidable along track or trapezoidal key 13 which is fastened to plate 1 and extends across the inner diameter of ring 2 as shown. The portions 1c of plate 1 are made of slightly less width than the rings. A trapezoidal slot is provided in the lower part of slide 12 and is fitted over key 13. Cams 14 and 15 are attached to slide 12 by means of adjustable slides and project upward therefrom. The construction is described in detail in connection with Figs. 10 and 11.

Rectangular rod 16 is attached to inner spherical gyroscope shell 17 (Fig. 2) which is rotatable in any direction through limited angles within outer spherical supporting shell 18 which is fastened to arm 19 integral with post 20 fastened to plate 1. Gyroscope 21 is mounted for rotation within inner shell 17 and may be driven by a separate motor as shown in Figure 6 or it may comprise a combination motor and flywheel or gyroscope as illustrated by gyroscope-motor 22 (Fig. 2). Such combination motors and gyroscopes are known. Shell 18 is split along plane 23 and the half-shells can be threaded together or fastened together with screws or in any suitable manner. Shell 18 is provided with top and bottom circular openings 24 and 25 which allow limited movement of rods 26 and 16 attached to inner shell 17 diametrically opposite. Rod 26 is shown broken away but may be as long as rod 16. In any event it serves to balance the latter rod so that shell 17 will remain in any position in which it is placed relative to shell 18. Inner shell 17 may also be split so that the contained gyroscope-motor can be inserted and removed when desired. The construction may be as shown in Figure 7 or the halves can be fastened by screws, suitable bearings being provided within the shell for the gyroscope which is also balanced.

Gyroscope-motor 22 is mounted on shaft 27 which is rotatable in bearings 28 and 29 fastened to the interior of spherical shell 30 which is suitably split. Shell 30 is rather thick and has circumferential groove 31 as shown in Figure 7. The shell is shown as comprising two parts, one screwed into the other by means of threaded shoulder 32 and cooperating threads on the opposite half-shell. Before screwing the shell halves together, ring 33 (Figs. 2 and 6) is placed on shoulder 34, for instance, so that the ring will be held in lateral position in groove 31 when the shell 30 is assembled. Ring 33 is freely rotatable in groove 31 around assembled shell 30, unless purposely locked thereto. This ring carries depending, attached, rectangular rod 35 and placed diametrically opposite balancing rod 36, shown broken away. Rod 36 is arranged to balance rod 35 so that the latter will ordinarily remain in any position in which it is placed, relative to outer supporting or bearing spherical shell 37 which is fastened to the end of arm 19 in any suitable manner. Ring 33 is slightly less thick than the depth of groove 31 so that it will not rub against the inner surface of shell 37. This shell has oppositely positioned slots 38 and 39 which extend somewhat more than 90 degrees so that rods 36 and 35 can be rotated to a position parallel with plate 1. These slots are considerably wider than rods 35 and 36 so that the latter can be moved in any direction within limited angles.

The motor of gyro-motor 22 can be supplied electric current through slip rings 40 on shaft 27, extended, and suitable cooperating brushes are provided. Flexible electrical connections like coiled wires 41 of Figure 3 can be used to bring current to the brushes and at the same time to allow practically unhindered relative movement between shell 30 and outer shell 37 which is fitted closely to shell 30 but allows free movement of the latter. Ball bearings can be placed in recesses between the shells, if desired. Wires 41 are brought out of shell 30 through holes therein.

As shown in Figure 6, shell 30 is assembled, with rotatable ring 33 in groove 31 and carrying rods 35 and 36 shown in fragmentary manner. In this case a separator motor 42 is shown attached to the inner surface of shell 30 and motor shaft 27 carries gyroscope wheel 22a. The motor, gyroscope wheel, and other parts within shell 30 are so balanced that shell 30 will remain in any position within shell 37, in which it is placed. This is to eliminate undesirable torques on the gyroscope tending to make it precess. Gyromotor 22 is similarly balanced as well as gyromotor 21. The separate motor and gyroscope wheel of Figure 6 represents an alternative construction. There should be as little friction as possible between shells 30 and 37 as well as between shells 17 and 18.

The general principles underlying this ground speed and drift indicator are that the rate of apparent rotation of a gyroscope relative to its support, due to rotation of the earth, is changed in proportion to the speed of the supporting vehicle in an east-west or reverse direction; and that the degree of divergence within a given period of time of a plumb line from an initial starting position in register with a gyroscopically controlled indicator is a measure of the speed of the aircraft or other supporting vehicle in a north-south direction, or the reverse. The axis of the first named gyroscope should lie in a plane parallel with the equatorial plane of the earth and the axis of the other or north-south gyroscope should be kept parallel with the axis of the earth, during the period of the test. The resultant of these two speed indications will show the true ground speed of the aircraft or other vehicle and the course or true direction of travel will also be indicated. The drift can be read as a component of the speed.

The gyroscope used to indicate the east-west component of speed will make one apparent revolution every 24 hours whether the support is attached to the earth or to an aircraft since the atmosphere is swept along with the earth at comparable speed. If desired, this gyroscope can be rotated by clockwise or the like at a rate of one revolution every 24 hours and the increased or reduced displacement of the gyroscope indicator, after a predetermined interval of time will be a measure of the west-to-east ground speed, or east-to-west ground speed, respectively. The reason for this is that the apparent rotation of the gyroscope due to the speed of the aircraft is added to the apparent angular displacement due to the rotation of the earth when the aircraft travels in a west-to-east direction, and the apparent rotation due to the earth's rotation is reduced by an amount equivalent to the speed of the aircraft when travelling in an east-to-west direction. The principle of operation will be explained in more detail later.

Referring to Figure 10, rod 16 of of such width that it can move between the closely adjacent ends of wedges or cams 14 and 15 in a direction along, say, the X axis or perpendicular to the long or Y axis of slide 12. The initial position of rod 16 for any speed determination is indicated in Figs. 10 and 11.

Assuming that the aircraft is flying northeastward, arrow E—W is pointed due east and the timing mechanism to be described later is released. Then there is an apparent displacement of rod 16 in the same direction as indicated by arrow E—W and parallel to it. The dimensions, timing, and other factors are so chosen that this displacement, due to rotation of the earth and its atmosphere and considering the aircraft as stationary, will bring the rear face 16a to the right until it is in register with the right edge of end 14a. Therefore, at this point, movement of cam 14 toward rod 16 is blocked, assuming that the rod is locked in position at the end of the automatically timed interval. Any further movement of rod 16 to the right, due to the eastward ground speed of the aircraft being added to the eastward speed of the earth and atmosphere, will allow cam 14 and slide 12 to be moved until the cam strikes rod 16 and is stopped by it. The faster the eastward component of ground speed of the aircraft the greater the distance rod 16 will be displaced beyond the right edge of end 14a within the predetermined time interval and the greater will be the possible movement of slide 12 before it is stopped by the flared cam 14 striking face 16a or its edge. Therefore the displacement of slide 12 relative to scale OE on plate 1 and aligned parallel with the slide, is a measure of the eastward component of the ground speed of the aircraft, assuming flight near the equator. Actually, rod 16 is maintained in its alignment in space by attached gyroscope 21, and slide 12 and attached cam 14 are moved relative to it, due to flight of the aircraft in a circular arc above the earth but rod 16 appears to move relatively. The cam or wedge construction provides a relatively simple means of obtaining large proportional movements of one member with respect to small movements of a cooperating member. Gears, levers, electrical amplifying systems, or other means can be used however.

At any latitude the angle of plate 1, relative to the horizontal, is adjusted so that relative apparent movement of rod 16 will be in a plane parallel with the equatorial plane of the earth. If rod 16 is long enough the arcuate relative displacement of its end can be considered as straight line displacement, for small arcs, which will usually be the case. If extreme accuracy is desired, however, the flared surface of cam 14, the surface 16a, or both, can be so curved or shaped that linear displacements of cam 14 will be directly proportional to relative angular displacements of rod 16. Cam 15 may be similarly shaped. Similarly, the end of rod 35, and cam 87 can be curved to compensate for arcuate movement.

An aircraft flying at a rate of several hundred miles per hour will in a few minutes cover an arc of ¼° or more, so that the displacements of the rods are easily readable.

Elongated rectangular frame 43 has a long rectangular vertical slot therein and is attached to slide 12. Narrow plate 44 is vertically slidable in the slot and is urged upward against cylinder 45 by suitable springs placed in the slot. Cylinder 45 has a spherically rounded end portion 46 which is attached to an end of shaft 47 having rotary and sliding bearing in horizontally bored block 48 extending vertically from plate 1 and attached thereto. The portion 46 can be an oblate spheroid to conform to the shape of the earth, if desired.

Elongated slot or groove 49 is cut in plate 1 parallel with the long axis of slide 12 and slightly spaced therefrom. Elongated rectangular slide 50 is slidable in slot 49 which should be of sufficient depth to hold slide 50 upright, although any suitable guides or supports may be used. The bottom of groove 49 can have a long, narrow central slot through which guide bolts can be screwed into threaded openings in the bottom edge of slide 50. Thin rectangular plate 51 is vertically slidable in a suitable slot in slide 50 and is urged vertically upward against rounded element 46 by means of suitable springs placed in the slot. Therefore, rotation of cylinder 45 will, through friction, move plate 44 and slide 12 through a corresponding distance along track 13 the direction of movement depending upon the direction of rotation of the cylinder. At the same time the rotating element 46 will, through friction, cause movement of plate 51 and slide 50 along slot 49, the direction of movement being the same as that of slide 12 and parallel thereto. The amount of displacement of slide 50 will however be less than that of slide 12, for the position of element 46 illustrated since the effective actuating diameter is less than that of cylinder 45. When the aircraft is flying near the equator shaft 47 is shifted until the upper edge of plate 51 is in contact with the full diameter of cylinder 45, and when flying at other latitudes, shaft 47 is shifted so that the diameter of element 46 in contact with plate 51 is reduced in the same proportion that the circumference of the earth at the latitude of flight bears to the earth's equatorial circumference.

While frictional drives are shown for the plates 44 and 51 it is obvious that the upper edges of these plates can be provided with rack teeth and suitable circumferential teeth cooperating therewith can be provided on cylinder 45 and element 46. In case the friction drive is used the surfaces may be roughened or magnetized to produce better traction.

Shaft 47 carries thin rigidly attached disc 52 which can be rotated in slot 53 in arm 54 which can be shifted to the right or left by integral arm 55 at right angles thereto and of rectangular cross section. Arm 55 is slidable to right or left in a rectangular slot in bearing guide 56 attached to an edge of ring 3 as indicated. Thin striplike cam 57 is attached to an edge of ring 2, and extends slightly more than half way around this ring, as shown particularly in Figure 2. The cam starts rising at point A and continues to rise until it reaches point B approximately and then declines continuously until point C is reached. Point B is an index to show the setting of cam 57 and ring 2 with respect to surrounding ring 3 which carries arcuate scales Se and Sw marked off in degrees of latitude on either side of the zero point of the scale which is shown as being in register with index B of the cam. This setting is used for flight at the equator. When however a ground speed determination is made at any other latitude, index B is turned until it is in register with the indicated latitude on scale Se or scale Sw, depending upon the general direction of flight, as described later. For flight south of the equator the scales would be used in opposite order.

The reason for making the above described adjustments is to have the plane of plate 1 parallel with the axis of the earth, during a ground speed determination. In this way rod or arm 16 is caused to precess in a plane parallel with the equatorial plane of the earth, for any latitude at which the aircraft may be travelling. Furthermore, this adjustment of ring 2 and attached plate 1 causes the axis of gyroscope 22 to be parallel with the earth's axis when the plate is oriented with respect to attached magnetic compass 58 so that arrow E—W lies in a true east-west direction.

Scales Se and Sw and the two rises of cam 57 are calibrated and related to the diameter or curvature of element 46 so that any setting of index B on ring 2, with respect to latitude scale Se or Sw will cause element 46 to be shifted to the right or left until it is properly set to move plate 51 and slide 50 a proper distance to compensate for latitude, for a predetermined angular rotation of shaft 47. Tension spring 59 is attached to guide 56 and to arm 54 to hold the end of arm 55 yieldingly against cam 57. The angular position of this cam therefore determines the lateral position of arm 54, disc 52 and therefore element 46.

The right end of the shaft 47 is slidable in axially bored cylinder 60 which is connected with the adjacent face of disc 52 by means of torsion spring 61 surrounding the shaft. The right face or end of cylinder 60 is rigidly attached to short shaft 62 having rotary bearing in posts 63 and 64 extending upward from plate 1. Shaft 62 is coaxial with shaft 47 and is prevented from axial movement by attached gears 65 and 66 on either side of post 64. Spring 61 allows shaft 62 and attached cylinder 60 to be rotated through a considerable angle without rotating shaft 47 which may at times be held by the friction between plates 44 and 51 and cylinder 45 and element 46. Rack 67 which is guided by a rectangular slot in block 69, parallel to plate 1, is placed beneath gear 66, in mesh therewith. Block 69 is attached to plate 1 and has another rectangular slot guiding movement of rack 68 parallel with rack 67. Rack 68 is placed above gear 65 with rack teeth in the lower surface of the rack and aligned to rotate gear 65 in a direction opposite to that produced by rack 67 acting upon gear 66. Both racks 67 and 68 are normally held out of contact with the respective gears by means of compression springs 70 and 71 yieldingly urging the buttons 72 and 73, and attached rack bars 67 and 68, respectively, outward from block 69 against which the springs press. The rack bars are limited in outward movement by respective pins 74 and 75, projecting from their upper surfaces, striking block 69. Button 72 is pressed toward block 69 to register a ground speed indication for westward flight and button 73 is pressed toward block 69 to register a ground speed indication for eastward flight. Since only one button is pressed at a time the racks do not interfere with each other and shaft 47 can be rotated in either direction.

Arm 76 is attached to the upper end of sleeve 77 through which pivot screw 78 passes and is screwed into a threaded opening in plate 1. Rack 67 is situated lower than rack 68 and so pin 74 is longer than pin 75 so that either pin will strike arm 76 to rotate the arm and sleeve 78 about the pivot when the corresponding rack is pushed its full travel toward or past shaft 62. The buttons and springs 70 and 71 limit the rack movement. Arm 79 is attached to sleeve 77 below arm 76 and carries attached arcuate cam 80 beneath it. This cam is concentric with pivot 78 and, in use serves to force arm 81, pivoted at 82 to plate 1, around pivot 82 so that V notch 83 in the arm will be forced against peaked rod 84 to align this rod. Rod 84 passes through attached plumb bob 85 and only the lower end of the rod need be peaked. This rod extends further toward plate 1 than rod 35 which depends from gyroscope shell ring 33. (See Figure 2.) The reason for this is that the adjacent flat face of rod 84 will strike slide 86 as a stop and the lower end of rod 35 will then serve to stop movement of cam 87 fastened to slide 86 above it, in the same way that rod 16 serves to stop movement of cam 14 or cam 15.

Cam rise 88 is attached to plate 1 near slide 86 and is struck by the V end of arm 81 to force that arm to rise when moved toward arm 84 so that the lower peaked portion of that arm will be gripped by the V slot and will be properly aligned when a ground speed determination is desired. When button 72, which is shown pressed toward block 69, is released, tension spring 89 attached to arm 76 and pin 90 on block 69, pulls arm 76 counterclockwise about pivot 78 (Fig. 1) and arm 79 and cam strip 80 are similarly rotated until the cam is not in contact with arm 81. Then tension spring 91 attached to arm 81 and to plate 1 pulls that arm away from rod 84 and downward off cam 88 and against stop 92 so that arm 81 will not then obstruct movement of arm 84 away from slide 86. Pivot pin 82 is vertically movable in a hole in plate 1, to allow the lifting and lowering of arm 81. Arm 76 is normally held against pin 75 which is forced against block 69. The movement of either rack will cause circular movement of arcuate cam 80 sufficiently to wedge the V arm 81 against rod 84. Any excess movement of the cam does not cause further pressure on arm 81 since the cam is concentric with pivot 78. The cam is arranged so that it does not strike post 63 or post 64 when spring 89 causes its return to starting position. It is shown in the position causing pressure of arm 81 against rod 84.

Tension spring 93 is attached to the end of arm 79 and to cable 94a passing around pulley 93a and connected to pin 94 extending from slide 86. Pulley 93a is rotatably fastened to plate 1 by screw 93b. Slide 86 is movable in elongated groove or slot 95 cut in plate 1 and aligned at right angles to the long axis of slide 12. Groove 95 should be deep enough to guide slide 86 properly but additional guiding means can be used as described in connection with slide 12. The faces of slide 86 are perpendicular to plate 1. Tension spring 96 in slot 95 is attached to the end of the slot and to slide 86 and normally keeps the slide pulled to its extreme right position with the left end of cam 87 at rod 35 or beyond it. When, however, arm 79 is swung around pivot 78 in clockwise direction as illustrated, the slide is pulled to the left, unless stopped by rod 35, by cable 94a and spring 93 which is sufficiently stiff to overcome spring 96 but which allows arm 79 to make its full travel as determined by the movement of pin 74 or pin 75. When either pin is moved through its full travel toward shaft 62 by its associated rack bar, arm 79 is rotated sufficiently to cause spring 93 to pull slide 86 to the left for practically the full length of cam or wedge 87 if the lower end of rod 35 does not obstruct the displacement. If, however, rod 35 is displaced relative to rod 84 and toward cam 87 a sufficient distance, then the cam will strike rod 35 and will be limited in movement thereby. Rod 35 is locked in relative position by pin 120 (Fig. 3) before spring 93 is pulled by arm 79. Upon release of button 72 or button 73, spring 96 pulls slide 86 back to the right to its starting position.

Right angle arm 98 is attached to a face of wedge 87 near its left end and carries attached thin tube 99 the axis of which is vertical to the plane of plate 1. This tube has lower end flange 100 which is slidable in a guide slot starting at the left end of rectangular bar 101 and continuing nearly its full length. The upper face of the bar is cut away to form open slot 102 of less width than the connected guide slot for the flange. Tube 99 projects upward through slot 102 and has cross hairs 103 in register with scale 104 extending centrally along the bottom surface of the guide slot and calibrated, preferably, in miles-per-hour ground speed. The zero point of this scale is at the axis of pivot pin or screw 105 which passes through a hole in bar 101 and is screwed into a threaded hole in slide 50 near its end, as indicated. Bar 101 may be made of transparent plastic or other material, if desired. The cross hairs 103 can then be read with respect to scale 104 and also with reference to scale O—NS marked on plate 1 and aligned perpendicular to scales OE and OW. Scale O—NS is preferably calibrated in miles-per-hour ground speed, as are scales OE and OW. Scale O—NS serves to indicate the true north or true south component of ground speed of the aircraft. The zero point of this scale coincides with the axis of screw 105 when scale 104 lies above scale O—NS in alignment therewith. The east or west component of ground speed can be read on scale OE or OW, respectively, by projecting a line from the axis of screw or pivot 105 to scale OE or scale OW, at right angles thereto. An index on slide 50 can indicate the position of this axis with respect to the above scales.

It is apparent, therefore, that if zero point 105 is shifted along scale OW as indicated, and if the cross hairs 103 are shifted along scale O—NS by arm 98 to a point representing the true north or true south ground speed component, then the true or resultant ground speed of the aircraft can be read on scale 104 as the distance from zero point 105 to the intersection of scale 104 with the cross hairs. The bar 101 will slip past tube 99 as a pivot, as screw 105 and slide 50 are moved to one side or the other, parallel with scales OE and OW. When slide 86 is resting in displaced position against stop 97, cross hairs 103 are directly over the axis of pivot 105, at zero position.

The component speeds as indicated on the scales are measures of drift as determined for any desired direction since the apparent direction of flight as indicated by the fore-and-aft axis of the aircraft can be correlated to the component speed at right angles to the apparent course, or along any other line desired, including the scale axes themselves. If drift in east or west direction, or in north or south direction is desired it can be read directly from the scales. If drift, considered as a perpendicular rate of displacement from the apparent line of flight is desired then the drift will be measured in terms of the sine of the angle between the apparent course and the actual course of flight.

The actual flight path is indicated in degree by the angle that scale 104 makes with respect to scales OE—OW or with respect to scale O—N$^s$. The angle may be measured by a movable protractor which can be a part of the instrument. The scales OE and OW are marked for flight north by east, and north by west, respectively. In case the aircraft is flying in generally southward direction, in one mode of operation legs 5 can be rotated 180° around pivot 8, or the whole device can be shifted so that arrow E—W points due east as for northward flight. By this procedure gyroscope rod 16 will still have the same relative movement with respect to cams or wedges 14 and 15 as before and east-west speed components can be read as previously described. The relations between plumb-bob controlled rod 84 and gyroscopically controlled rod 35 will, however, be different in this case than for northward flight, since the plumb bob rod tends to leg behind the gyroscope rod due to travel northward or southward around the earth. The gyroscope rod tends to maintain its alignment in space and the plumb bob rod tends to point toward the center of gravity of the earth. Since if the device is rotated 180° after turning the aircraft 180° to fly south, arrows E—W and N—S will be in the same directions relative to the earth for southward flight as for northward flight and the rod 84 will tend to lag behind rod 35 in opposite sense to that described.

Means for utilizing displacement of rod 84 in either direction relative to rod 35 are shown in fragmentary Figs. 12 and 13. The rods have inclined surfaces meeting on a relatively narrow line 80*a* so that the same displacement of either rod, toward cam 87 will stop the cam virtually in the same position as it moves to the left. The locked rods are aligned as before by the V slot and peak and are forced by arm 81, slightly resilient in this case, until rod 35 strikes stop 202 for southward flight and until rod 84 strikes stop 203 for northward flight, since in the first case rod 84 projects beyond rod 202 and stops movement of cam 87 and in the second case, rod 35 projects beyond rod 84 and stops cam 87. Stops 202 and 203 are two stiff metal strips either of which can be vertically moved through its guide slot in plate 1, upward to serve as a stop or downward to be moved from the path of the associated rod, being held in position by friction. Stop 202 is pulled up for southward flight and stop 203 is pulled up for northward flight.

In addition to the displacement between the two rods due to the flight component along a meridian, there will be a certain side shift between the rods due to the earth's rotation and to flight in paths other than true north or south. This component at right angles is not used in the tests however since V arm 83 aligns rod 84 sidewise, and rod 35 locked to it, for any test.

As shown in Figure 8, cam 87 can be inclined or curved on both faces, so that it can be used for either direction of travel, northward or southward. In that case pendulum rod 84 should be free to swing on either side of slide 86 since the rod 84, pointing toward the center of the earth, will be at an angle to the plane of plate 1 except for flight at the equator where it will be perpendicular. For northward flight the rod will swing toward edge 1*a* of plate 1 but if the plate is turned through 180° for southward flight, then pendulum arm 84 will swing toward edge 1*b*, and cam 87 or slide 86 should not obstruct this movement in starting position. The nearer flight occurs adjacent a pole of the earth, the more rod 84 will tend to swing parallel to the plane of plate 1.

The construction shown in Figure 8 provides means for using rod 84 as a limit stop for northward flight and southward flight. In the first case rod 84 will strike stop 106 which can be retracted through a slot in plate 1, and in the second case the rod will strike stop 107 which can also be retracted when desired. For southward flight rod 35 will act as a stop for sliding element 86 and face 87*a* of cam 87, and for northward flight the opposite side of rod 35 acts as a stop for the opposite face of cam 87. A notched arm 81*a*, shown in fragmentary manner can be used to align arm or rod 84 in the same manner as previously described for arm 81. It is possible of course to swing rods 84 and 35 to the same side of slide 86 for each test, if that is desired. The curves, stop positions, or other elements would be designed to make that possible.

Figure 4 shows a suspension for arm 84 supporting plumb bob 85. Fixed support 19 may be an extension of arm 19 shown in Figure 2 and bolt or screw 108 is threaded into a hole in the end of arm 19, a suitable washer being provided. Arm 84 can therefore swing through angles of 90° or more across slot 95, on either side.

Another suspension is shown in Figure 3. Rod 84 is attached to ball 109 which is rotatable in any direction in spherical bearing or socket 110 having a cut-out 111 across it to allow 90° movement of the rod in either direction perpendicular the plane of the paper, and limited movement toward or away from post 112 having arm 113 to which bearing socket 110 is attached. Socket 110 may be split, for assembly. Peaked rod 84b is attached to the horizontal portion of arm 84 and is perpendicular to plate 1, at the equator. Weight or plumb bob 85 is attached to rod 84 as before. Post 112 is fastened to plate 1 and weight 85 has a bore through its right side face to receive solenoid coil 114. Non-magnetic sleeve 115, carrying hook 116, is attached to coil 114 and has a bore coaxial with the coil central opening. Cylindrical iron plunger 117 having an axial bore therein is slidable in the coil and sleeve opening and is normally pushed to the right against arcuate stop 118 by compression spring 119 within the coil. Stop 118 consists of a strip of metal or other material concentric with ball 109 and is spaced from and attached to rod 35 fastened to ring 33 which is movable around gyroscope shell 30, as previously described. Cylindrical plunger 120 is made of steel and has a pointed right end adapted to engage a depression in stop 118, being urged in that direction by the compression spring shown in the axial bore in cylindrical plunger 117. The depression serves as a zero or starting point of alignment for rod 84 and rod 35, arm 84b being placed near arm 35 for convenience. Hook 116 serves as a means for preventing spring 119 from pushing weight 85 and arm 84b away from arm 35. This hook is normally pulled against the right hand face of arcuate strip 118 by the springs.

It will be seen that the rods are normally locked together. When it is desired to release them for relative displacement, solenoid coil 114 is suitably energized through flexible leads 121, and plunger 117 is pulled into the solenoid at the same time that pointed plunger 120 is magnetically pulled into plunger 120. Therefore strip 118 and rod 35 are released so that there can be relative displacement of rods 84—84b and 35 about their respective pivots, in directions perpendicular to the plane of the paper. There is sufficient play between hook 116 and strip 118 to allow limited free movement. At the end of the predetermined time interval of the test, the time clock 132 (Fig. 2) causes the solenoid circuit to be broken and plunger 120 is quickly forced against stop or holding strip 118 by spring 119 so that the rods 84b and 35 are locked in relative position by the friction between plungers 117 and 120 and strip 118. The adjacent surfaces can be roughened or otherwise treated to provide good frictional engagement. The spring urging pointed plunger 120 to the right is weaker than spring 119 so that plunger 120 can, if desired, be forced back into its recess when plunger 117 and strip 118 are frictionally locked. Plunger 120 is forced to the right into the depression in strip 118 only when the two are in register, i. e., in starting position. The construction shown makes it possible to align the two elements with a pointed plunger and then to lock them together with larger surfaces.

The spherical shell 37 is constructed (as shown in Figure 2) and is supported by post 20 shown in fragmentary manner. A certain amount of side play or cross movement of rods 84 and 35 is made possible by the ball and socket construction and by the width of slot 39. This allows for normal fluctuations of the aircraft and for curvature of the flight path at angles to the direction of flight. Like parts are given like designations as before, in Figures 3, 4, and 5, and in other figures.

Ball 109 and gyroscope ring 33 carrying rod 35 are rotatable about an axis passing through the center of the ball and ring and aligned parallel with the plane of plate 1. Rods 84 and 35 can therefore be swung about this axis even though they are locked together. This is necessary in order to swing the two rods back to the positions shown in Figure 1, for instance, for northward flight, since at any latitude other than at the equator the two locked rods swing at an angle with respect to plate 1 and not perpendicularly as shown.

In order to swing the two rods, locked together after a period of release, cross rod 122 (Fig. 2), attached to arm 123, is provided. This arm is pivoted at 124 to post 20 and is normally held up in the dotted position shown, by tension spring 125 attached to the arm and to arm 19, a suitable stop being provided. Bar 122 is therefore normally out of the way of rods 84 and 35 and weight or plumb bob 85. These rods may swing leftward about their pivots in clockwise direction as seen in Figure 2. After they are finally locked together, however, for a ground speed determination, arm 123 is rotated counter clockwise about pivot 124 so that cross bar 122 strikes rod 84 and forces the two rods around to the position shown, with the lower end of rod 84 striking slide 86 as a stop. Another suitable stop could be arranged, however.

In order to cause this counterclockwise movement of arm 123, arcuate solenoid 126, concentric with pivot 124, is attached to post 20. Arcuate iron plunger 127 is attached at one end to arm 123 and is movable in the curved space in the solenoid which can be energized by current through conductors 128 and 129 leading to battery or other current source 130, through spring switch 131 which is normally open. This switch is mounted on a short post on plate 1 and is positioned so that it is struck by arcuate strip 89 soon after this strip begins moving through its circular path. The switch is maintained closed until the actuating button 72 or 73 is released. When switch 131 is closed, therefore, solenoid 126 is energized to pull plunger 127 into it and to cause bar 122 to bring the rods 35 and 85 to proper position as described.

Timing device 132 is shown as a key wound spring-driven device but it can be a synchronous motor or any other suitable timing means. The housing 132 is attached to the under surface of plate 1 and contains a clock-like spring and escapement for governing the rate of rotation of shaft 133 having attached winding key 134. Cam 135 having cam rise 136 is fixed to shaft 133 and rotates with it. Pin 137 on cam 135 is normally held by catch 138 pivoted to housing 132 so that the cam is normally locked in position with the driving spring wound. This spring urges the cam to rotate in the direction of the arrow so that, after release, the cam rise 136 will strike button 139 on resilient switch arm 140 to force this arm and its attached contact toward contact 141 both of which are mounted on an insulating block 142 attached to housing 132. The switch 140—141 will therefore be closed until cam rise 136 rotates past button 139 so that the resiliency of arm 140 will then quickly move the contact away from contact 141 to open the circuit which includes battery 130, conductors 143 and 144, solenoids 114, 146, 147; conductor 128, and switch 149 leading to the other terminal of the battery.

Solenoid 114 is shown in detail in Figure 3 but any suitable type of magnet or solenoid can be used. This solenoid, when energized, releases rod 35 from locked relationship with arm 84. Solenoid 146 is fastened to spherical ring 33 by threads or otherwise and has plunger 145 the inner end of which passes through a hole in ring 33 and engages inner spherical shell 30 to lock the ring and shell against relative movement when the solenoid is energized. The compression spring shown surrounding plunger 145 is fastened to the plunger and to solenoid 146 and normally holds the plunger tip, which may be sharpened, away from shell 30 so that rod 35 may be freely moved with rod 84. The plunger is made of soft iron or the like and may have a non-magnetic tip.

The plunger of solenoid 147 is made similarly but having iron tip section 149 and joined brass section 150 around which tension spring 151, attached to the plunger and to solenoid 147, is coiled and normally forces the inner tip of plunger 149 against inner gyroscope shell 17 to lock it against movement relative to outer gyroscope shell 18. Solenoid 147 is suitably attached to shell 18 and a hole is provided in this shell for passage of plunger 149. The energization of solenoid 147 therefore causes plunger 149 to be pulled outward against the tension of spring 151 to release shell 17 to allow free movement of this shell and attached rod 16, relative to shell 18.

Solenoid 148 is fastened to block 152 attached to post 20 or integral therewith. (See also Figure 1.) The plunger of this solenoid is rectangular iron bar 153 which is slidable parallel with plate 1, in a rectangular slot in block 152, and carries right angle arm 154 to which conical point 155 is attached. This point is adapted to mesh with similar shaped depression in rod 16 to align this rod. Similarly, rectangular spaced bar 157 is slidable parallel to bar 153, in a rectangular slot in block 152 and carries right angle arm 158 having attached conical point 159 adapted to engage similarly shaped depression 160 in the opposite face of rod 16. Therefore if arms 154 and 158 are moved toward each other to fixed adjacent positions each time a test is finished, points 155 and 159 will cause alignment of rod 16 in a direction along the Y axis and the arms 154 and 158, pressing rod 16 between them, will align that rod along the X axis. Rod 16 will therefore be automatically reset to the same starting position for each test. Sufficient slippage between plunger 149 and shell 17 can be allowed to permit the resetting or solenoid 147 can be energized while arms 154 and 158 are being moved toward each other.

The means for producing coordinated movement of bars 153 and 157 includes slotted rocker arm 161 pivoted at 162 to post 163 extending from block 152. Pins 164 and 165, in bars 153 and 157, respectively, cooperate with the slots in arm 161 as shown and cause proportional displacement of one bar in one direction when the other bar is displaced in opposite direction. Block 152 may be of brass or other non-magnetic material and bar 153 is of iron except for joined end portion 153a which is of brass. The junction is shown by the dotted line at 166. Therefore, when solenoid 148 is energized, part of the bar beyond junction 166 is pulled into it by magnetic action and bar 157 is simultaneously moved by pin 165 in opposite direction. Compression spring 167 resting against block 152 and urging bar 157 and integral flange away from block 152, normally keeps arms 154 and 158 retracted, in the positions shown.

Solenoids 114, 146, and 147 are simultaneously energized by the closing of switch 140—141 by cam rise 136 and they are simultaneously de-energized when the switch is opened. It is assumed that switch 149 is closed before any test. One terminal of solenoid 148 is connected to a battery terminal through connected wires 168, 128, and switch 149. The other terminal of this solenoid is connected to the other terminal of battery 130 through normally open switch 169 having a resilient contact arm adapted to be struck by sharp cam 170 attached to the inner face of cam 135 near its edge. The resilient contact arm is connected to wire 143 and the switch is mounted on housing 132 being suitably insulated. The sharp cam 170 strikes the resilient arm of switch 169 and closes the circuit to solenoid 148 momentarily before switch 140—141 is closed. This insures that the arms 154 and 158 will re-set rod 16 to starting position just before each test.

Solenoids 171 is attached to the forward face of block 152 and is connected to wires 128 and 129 so that it is energized simultaneously with solenoid 126. Plunger 172 comprises an outer brass section joined to an inner iron section which may extend into a recess in block 152. This plunger is pulled to the left against a suitable stop when solenoid 171 is energized. Tension spring 173 attached to the plunger and to the block normally holds the plunger retracted so that it will not interfere with movements of rod 84 in the vertical or near-vertical position relative to plate 1. When rod 122 is pulled down by solenoid 126 plunger 172 is simultaneously moved a definite distance to the left to serve as a stop. This construction is not essential but allows for vibration and erratic movements of the rods 84 and 35.

Figure 5 shows an alternative support for the plumb bob 85 and rod 84. In this case the plumb bob is supported on stub shaft 174 attached to inner shell 30. The outer spherically curved bearing shell 37a is cut away at 175 so that shaft 174 will have free movement within limits. Suitable collars on shaft 174 prevent axial movement of the bored upper end of rod 84 but allow free swinging movement in a plane perpendicular to the plane of the paper. Bearing half-shell 37a is fastened to post 176 attached to plate 1. Similar bearing half shell or socket 37b is attached to post 176a fastened to plate 1 and stub shaft 174a extending from shell 30 in line with shaft 174 supports arm 84a carrying weight 85a adapted to balance weight 85. Rods 35 and 36 and ring 33 are as previously described. This construction allows gyroscope rod 35 to be turned in either direction to follow arm 84 which may be rotated in either direction, for northward or southward flight. The balanced construction allows the plumb bob to remain parallel with the gyroscope rod so that there is little side relative movement, Magnet 114a, attached to weight 85, may be energized to lock iron rod 35 to it.

In Figures 1 and 2, arm 177 integral with handle 178, is pivoted to an edge of ring 2 by means of bolt 179 passing through collar 182. Grip or handle 180 is parallel with handle 178 and has a right angle portion fixed to ring 3. Pawl 181 is pivoted at 183 to grip 180 and has extended portion 184 adapted to be struck by thin cam 185 attached to handle 178, when the handle is pulled toward grip 180 about pivot 179. This cam then strikes extension 184 and lifts pawl 181 away from the adjacent edge of ring 3, against tension of spring 186 attached to the pawl and element 180. The edge of ring 3 is preferably serrated or roughened so that pawl 181 will normally lock ring 2 against rotation to ring 3.

Arm 177 has perpendicular portion 187 adapted to press plates 44 and 51 down against their supporting springs when handle 178 is pulled toward grip 180. This depression of plates 44 and 51 frees cylinder 45 and integral element 46 for lateral movement by shaft 47 which is shifted by arm 54 as a result of rotation of cam 57.

Level 188 is fastened to plate 1 and may be of any suitable type, including the bubble type which indicates horizontal position in any direction.

If there is no slippage between cylinder 45 and plate 44, or between element 46 and plate 51, these plates and slide 12 will be moved until stopped by a wedge 14 or 15 locking against rod 16, when a button 72 or 73 is pushed; spring 61 being wound by movement of one of the racks after stoppage of rotation of cylinder 45 and shaft 47. Therefore when the actuated button is released, its associated spring will move the rack back to starting position and cylinder 45 and element 46 will be rotated through the same angle to return plates 44 and 51 and slide 12 to the starting position. In order to allow for slight slippage, V block 189 is attached to the rear end of slide 12 and vertical V slot 190 is cut in the right face of slide 50. Similarly shaped finger 191 is attached to bar 192 which carries another V finger 193 at lower level and adapted to engage V groove 190. Finger 191 is adapted to engage groove 189. Rectangular bar 192 is slidable parallel to plate 1 in a rectangular slot in block 194 fastened to plate 1. Tension spring 195 fastened to block 69 and to pin 196 attached to bar 192 normally holds fingers 191 and 193 pulled to the right against block 194. When, however, the end of arm 76 is pulled around by spring 89 to strike cam 197 integral with bar 192, weaker spring 195 is overcome and fingers 191 and 193 are moved to the left to engage respective grooves 189 and 190 to align slides 12 and 50 accurately at their starting positions.

As shown in Figure 2 pendulum or weight 198 is suspended from attached ring 3 in a plane passing through the center of the ring and perpendicular to the plane thereof. This weight may be much larger than indicated and serves to maintain ring 3 aligned about pivots 4 with respect to the center of gravity of the earth. U-shaped magnet 199 is fixed to plate 6 and provides a magnetic field through weight 198 so that eddy currents induced into this metal will cause damping to prevent excessive oscillation. Any other type of damping device such as a bath of viscous liquid around weight 198 can be used. The parts supported by plate 1 are so distributed that this plate is balanced about pivots 4. Extra balancing weights can be attached to plate 1 for that purpose, if necessary. Therefore hanging weight 198 can swing in an east-west direction since the axis passing through pivots 4 is kept pointing true north during a test. Plate 6, carrying posts 5, can be rotated around pivot 8 to maintain the Y axis passing through pivots 4 pointing true north. Base plate 7 is ordinarily fixed to the aircraft and is parallel with the floor, or horizontal. This plate can be adjustable though or the aircraft can be manipulated to keep the plane of plate 7 horizontal or tangent to the earth, during any test. Level 200 attached to plate 6 can be observed to show when the plates are horizontal.

It will be seen that, during the period of a speed determination lasting from say 1 minute to 10 minutes, as desired, the plate 1 will be rotated in an east-west direction relative to gyroscopically controlled rod 16 and so the east-west ground speed component, if any, will be indicated. Unless provision is made to keep the plane of plate 1 exactly parallel with the axis of the earth there will be a certain amount of turning of plate 1 due to travel in a north-south direction at constant altitude but this component of rotation of the plate, being small, will have a negligible effect upon the apparent movement of rod 16 in east-west direction. Compensation for this could be provided however. The north-south turning of plate 1 causes plumb bob 85 and attached arm or rod 84 to swing relative to gyroscopically controlled rod 35 so that the north-south ground speed component is indicated, the axis of gyroscope 22 being parallel with the axis of the earth to avoid precession.

If desired a gimbal mounting for ring 3 can be provided so that it can be moved in any direction or it can be mounted to be rotatable in its own plane relative to pivots 4. This refinement is hardly necessary for usual purposes however.

Figure 9 illustrates how plate 1 is aligned parallel with the axis of the earth regardless of latitude. This illustration also shows modified supports for ring 3. These supports 201 are thin arcuate bearings fitting into a circumferential groove around the edge of ring 3. This ring is therefore supported and guided by elements 201 and can be rotated relative to them. Ring 3 could therefore be rotated to hold plate 1 parallel with the earth's axis, during a test. This illustration shows the alignment of plate 1 for any test but bearings 201 are not essential.

In Figure 10 trapezoidal wedges or cams 14 and 15 are fastened to respective cross slides 14b and 15b slidable at right angles to the long axis of slide 12 in keyways 14c and 15c cut in slide 12 and having flared edges to prevent the slides from slipping out. Bars 14d and 15d are screwed to the floors of the keyways and serve as stops for leftward movement of slides 14b and 15b. Thumbscrew 14e is threaded through a vertical hole in slide 14b and may be screwed down against the keyway floor to lock the slide in either of its two positions. Similarly thumbscrew 15e serves to lock slide 15b in either of its two positions.

Fragmentary Figure 10 shows the initial relative positions of wedges 14 and 15 and gyroscope rod 16 for north-by-east and north-by-west flight, assuming that arrow NS parallel with the Y axis is directed to the true north. The trailing lower edge 16a of rod 16 overlaps edge 14a of wedge 14 by a distance equal to that travelled by edge 14a relative to gyroscopically controlled rod 16, due to the earth's rotation, during the predetermined test interval of free relative movement.

Therefore, considering that the aircraft is stationary relative to the earth, the edge 16a of rod 16 will apparently move to the right until it is in register with edge 14a during the aforesaid interval as determined by the timing device to be described later. In this relative position wedge 14 is locked against movement along the Y axis toward rod 16 but any further relative displacement beyond edge 14a as a result of due-east speed of the aircraft will allow the wedge and slide 12 to be moved toward rod 16 along track 13 until a point or line on face 14f strikes edge 16a and is stopped thereby. The faster the due-east component of ground speed of the aircraft the further will edge 16a apparently move to the right of edge 14a and the greater the distance wedge 14 will be moved along the Y axis until stopped by rod 16. Therefore the displacement of wedge 14 in a direction toward rod 16 along track 13 is a measure of the due-east component of ground speed of the aircraft.

Edge 15f of generally opposed wedge 15 is placed to the right of leading edge 16b of rod 16 a distance equal to that travelled toward edge 16b at the end of rod 16 by edge 15f due to the rotation of the earth, during the automatically timed interval of the test, considering that the aircraft carrying the instrument is stationary with respect to the earth. Apparently, rod 16 moves to the right during this interval until edge 16b is in register with edge 15f of wedge 15 and so this wedge is blocked from movement toward rod 16 along track 13. If, however, the aircraft flies north-by-west, or due west, the circular displacement of the aircraft westward will cancel a portion of the circular displacement in space of the aircraft eastward, due to rotation of the earth, and so edge 16b will not reach edge 15f by a distance corresponding to the due-west component of ground speed of the aircraft. Wedge 15 can then be moved with slide 12 toward rod 16 until stopped by edge 16b and the amount of this movement is a measure of the due west component of speed of the aircraft relative to ground. It is assumed that the speed of flight is less than the circumferential rotational speed of the earth. If the aircraft speed is greater the wedges can be specially set.

It is assumed in the above description that the aircraft flies at substantially constant altitude and speed during the test. Since the height of the aircraft above the ground is small compared to the radius of the earth, considerable variation of altitude of flight may be permissible without seriously affecting the results. Sudden accelerations should be avoided during tests. Arcuate scale 84c (Fig. 3) concentric with ball 109, will indicate the vertical position of arm 84, suitable indices being provided. The instrument can include means for shifting or changing scales or any other means for compensating for flight at different altitudes, if desired. The plate 1, or plate 6 can be properly aligned by gyroscopic means if desired.

In the above-described speed determinations slide 14b is locked by screw 14e, against stop bar 14d and slide 15b is locked by screw 15e in the position shown, with the right edge of the slide in contact with the edge of keyway 15c.

Now contrariwise, if the aircraft is flying generally southward, and if the instrument remains fixed relative to the aircraft, rod 16 will appear to move to the left as shown in Figure 11 and the slides and attached wedges 14 and 15 have to be shifted and locked in position, with the right edge of slide 14b adjacent the edge of keyway 14c and with the left edge of slide 15b adjacent the stop bar 15d. Rod 16 is shown in usual starting position and the above shifts of the wedges bring edge 14g of wedge 14 to a point overlapping edge 16c of rod 16 by a distance equal to the timed apparent shift to the left of rod 16 relative to the edge 14g, due to rotation of the earth and accompanying atmosphere, and assuming that the aircraft is stationary with respect to the earth. If the aircraft is flying south by east, then the apparent displacement of rod 16 to the left, due to the component speed of the aircraft due-east, will be added to the displacement due to the earth's rotation and wedge 14 can be moved toward rod 16 until its left inclined face strikes edge 16c and is stopped thereby. The amount of extra displacement parallel with the X axis of edge 16c relative to edge 14g is then proportional to the true east ground speed component of the southeastward-flying aircraft and accordingly this ground speed component can be measured by the relative displacement of wedge 14 with respect to its associated scale.

Wedge 15, in Figure 11, is shown in such position that its edge 15g is displaced to the left of edge 16d of rod 16 a distance equal to the distance apparently moved by edge 16d to the left during the timed interval, due to rotation of the earth and its atmosphere, the rod 16 being of course gyroscopically maintained in its alignment in space. Therefore edges 16d and 15g will be brought into register during the timed interval, by rotation of the earth, and if the aircraft is flying southwestward then part of the apparent due-east displacement of edge 16d toward edge 15g will be cancelled. The greater the due-west component of ground speed the further edge 16d will be to the right of edge 15g at the end of the timed interval and the further wedge 15 can be moved parallel with track 13 toward rod 16 before its right inclined edge strikes edge 16d and is stopped thereby. This displacement of wedge 15 and attached slide 12 is therefore a measure of the due-west ground speed component of the southwestward-flying aircraft and can be read with respect to its associated scale.

The preceding discussion assumes that the edge 1b of plate 1 is forward for both northward and southward flights and that arrow NS points true north in the first case and true south in the latter case. When the flight is northward plumb bob rod 84 swings toward edge 1a of plate 1 since it points toward the center of gravity of the earth. When the flight is southward arm 84 swings in opposite direction relative to slide 86 and cam 87 and these elements should be initially sufficiently shifted sidewise so that they do not obstruct movement of rod 84, and rod 35 to which it is locked. The gyroscope rod 35 can be suspended as shown in Fig. 5 and rod 84 can be suspended as illustrated in Fig. 3 or Fig. 4.

Cam 87 can have two inclined faces as shown in Fig. 8 or the rods 84 and 35, after being locked together again after their relative displacement, can be rotated to the same side of cam 87 as that shown in Fig. 1, the rotation being effected by another cross rod similar to rod 122 but acting in opposite direction while shifting the rods 84 and 35 which can then be pressed against the slide or another stop as indicated. The shifting of cam 87 will occur after this procedure.

When the aircraft is travelling northward, plumb bob rod 84 will lag behind gyroscope rod 35 and thus will rotate relatively clockwise about its pivot (Fig. 2), due to curvature of the earth, during the timed period in which it is free to move relative to gyroscope rod 35 which remains fixed relative to plate 1 when ring 33 is locked to its supporting shell 30. When the aircraft is travelling southward plumb bob rod 84 will still tend to increase its lag behind rod 35 even though both rods in this case will be on the opposite side of slide 86, since the aircraft is flying in reversed direction. The two rods can, after finally being locked together, be swung to the same side of cam 87 as indicated in Figure 2. Rod 84 is shown in a lagging position with respect to rod 35, as it would be after temporary release from rod 35 during the timed interval. When rod 84 is pressed against slide 86 or any other suitable stop by V arm 81, rod 35 then acts as a stop to limit movement of cam 87 to the left, pulled by cable 94a attached to pin 94 extending from slide 86 and attached to the end of spring 93 after passing around pulley 93a rotatably fastened to plate 1 by screw 93b, as described.

Since cam 87 is narrowed from right to left it will be seen that the more the relative displacement between rods 84 and 35 the further the latter will project toward cam 87 from the fixed or stop position of rod 84 and therefore the less slide 86 will be moved to the left when pulled by cable 94a and spring 93 which is pulled to the right by arm 79 when one of the buttons 72 or 73 is pressed. Therefore, since scale O—N$^s$ increases from O to the right an increased displacement between rods 84 and 35 will cause a proportionately increased indication of the north or south ground speed component on scale O—N$^s$.

In operation, suppose that the aircraft is flying southwestward in the northern hemisphere. Wedges 14 and 15 are arranged as shown in Fig. 11, for southward flight and handle 178 is squeezed toward grip 180 and ring 2 is rotated until index B is in register with the latitude of flight as indicated on scale S$w$, the latitude being known. This arranges plate 1 parallel with the axis of the earth, assuming that plate 6 is maintained horizontal by observing level 200. Arrow E—W is held pointing due west for the interval of the test. Then rod 84 is locked to rod 35 by causing pin 120, for instance to fall into the aligning depression in strip 118 and the two rods are allowed to swing around their pivots by gravity until their axes point to the center of gravity of the earth, being suitably damped by magnet 85a or any other damping means. Then catch 138 is pressed to release pin 137 so that cam 135 is rotated in the direction of the arrow at uniform speed, with the result that cam 170 momentarily closes switch 169 to energize solenoid 148 and so to align rod 16 at starting position. Then as the cam continues to rotate, cam rise 136 closes switch 140—141 which causes energization of solenoids 114, 146, and 147, resulting in release of rod 84 or weight 85 from rod 35 and in locking ring 33 to gyroscope shell 30, as well as in unlocking gyroscope shell 17 for free movement relative to outer bearing shell 18. These conditions continue until the rotating cam rise 136 passes button 139 and causes switch 140—141 to break the circuit to the three solenoids after the time interval as predetermined by the arcuate length of cam rise 136, and its rotational speed. Then rods 84 and 35 are locked again relatively, and simultaneously ring 33 is unlocked from shell 30, and shell 17 is again locked relative to shell 18.

During the timed interval, rod 84 and rod 35 will have shifted relative to each other as previously described, so that rod 84, or 84b, if used, will trail rod 35 by an amount representing the true southward ground speed component. Likewise, during the same timed interval rod 16 will have been apparently rotated or shifted relative to wedge 15, due to the combined rotation of the earth and the due-west component of ground speed of the aircraft. Then marked key or button 72 is pushed toward block 69 its full travel. This causes pin 74 to rotate arm 79 and arcuate cam 80 clockwise about pivot 78, closing switch 131 to energize solenoids 126 and 171, resulting in arm 123 swinging rod 122 down to force relatively locked rods 84 and 35 against slide 86 as a stop, arm 84 (or 85a if that construction is used) striking the stop. Shortly after closing switch 131, cam 80 and arm 81 will align rod 84 in the position shown in Figure 1 and spring 93 will, by means of cable or cord 94a, pull slide 86 to the left (Fig. 1) until cam 87 strikes projecting rod 35 and is stopped thereby, leaving tube 99 and cross hairs 103 in the position shown, indicating the due-south ground speed component.

During this time, cylinder 45 is rotated by rack 67 in a direction to move slide 12 along track 13 toward edge 1b of plate 1, until wedge 15 strikes locked rod 16 and is stopped by it. In the meantime rotating element 46 will have moved slide 50 in the same direction as slide 12 but through less distance, in the same proportion that the circumference of the earth at the latitude of flight bears to the circumference of the earth at the equator. Therefore the due-west ground speed component is represented by the position of the axis of pivot 105 with respect to scale OW. The true resultant ground speed can then be read on scale 104 in terms of the distance from the axis of pivot 105 to the intersection of cross hairs 103. The drift and direction of flight can be observed as explained previously. Then key 72 is released and the various springs cause the associated parts to be re-set to zero or starting position as previously described. Key 134 is then turned to rewind the spring of the timing device and to rotate cam pin 137 back to be locked by catch 138. A suitable ratchet allows rewinding of the spring.

If the flight had been made in northwestward direction, in the northern hemisphere, index B would be turned to be in register with the proper latitude indication on scale S$e$, in order to place plate 1 parallel with the axis of the earth and arrow E—W would be pointed due east. If the flight were in northeastward direction index B would be set also with respect to scale S$e$ and arrow E—W would be also maintained pointed due east. The settings of wedges 14 and 15 would however be changed for northward flight as indicated in Figure 10. It is assumed in the above discussion that arrow NS is maintained pointing due north for northward flight and due south for southward flight.

A chart of the simple changes necessary for northward or southward flight can be provided or indices can be arranged so that moving a control element will automatically make the changes or indications of changes needed.

Figure 14:
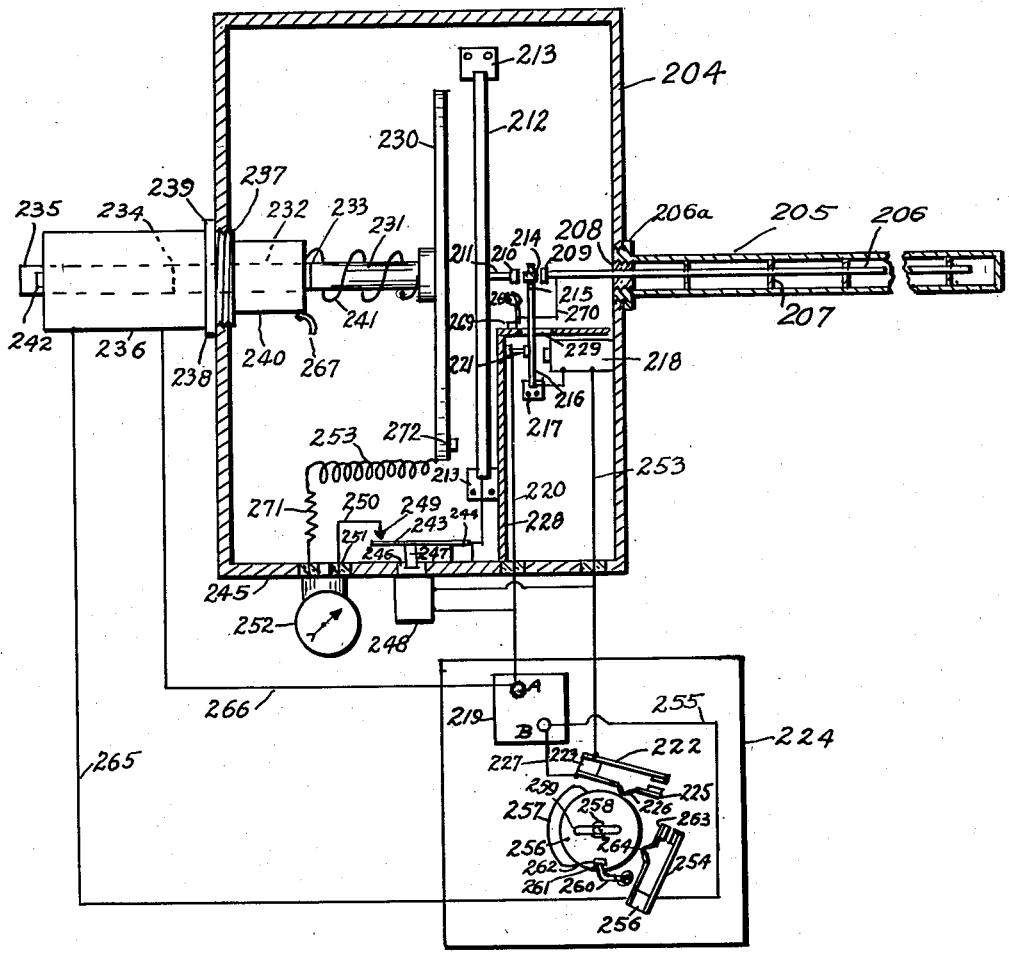
Figure 14 is a top plan view, in part section, of an electrical ground speed indicator, showing a casing with cover removed.

Figure 14 illustrates an electrical ground speed indicator based upon the earth's magnetic field.

Casing 204 is of metal and may be of iron to serve as a shield against magnetic fields as well as an electrostatic shield. Long tube 205 is of copper or other suitable metal and is screwed into a threaded hole in a wall of the casing, as shown, flange 206a acting as a stop. Copper or other metal wire or rod 206 extends for nearly the full length of tube 205 and is supported coaxially therewith by passing through central holes in mica, porcelain, or other insulating discs 207 which may be cemented or forced on the rod 206. Threaded porcelain or other insulating bushing 208 is screwed into inner threads at the end of the tube. Bushing 208 has a central hole through which rod 206 passes and is rigidly fastened thereto, with cement or otherwise. Electrical contact 209, preferably of the same metal as rod 206, is integral therewith or is fastened to the rod by threads or in any suitable manner. It is preferable that element 209 be of the same metal as rod 206 in order to avoid contact and thermoelectric potentials.

Contact 210 is attached to rod 211 which is attached to plate 212 by threads or otherwise. The contact 210, rod 211, and plate 212 are all made of the same metal as contact 209 and rod 206, in order to avoid contact potentials and thermo-E. M. F.'s. Plate 212 is mounted in porcelain insulators 213 screwed to a wall of the casing. Contact button 214, made of the same metal as the other contacts, is screwed into Bakelite or other insulating disc 215 fastened to thin flexible metal arm 216 anchored in metal block 217 screwed to the casing wall.

Magnet 218, fastened to the right casing wall over a hole therein, causes flexible arm 216 to vibrate at a relatively rapid rate when energized with current from battery or other current source 219. Conductor 220 leads from terminal A of battery 219 and is connected with make-and-break contact 221 adapted to close the circuit to magnet 218 through arm 216 when in contact therewith. Arm 216 is connected with a terminal of the magnet the other terminal of which is connected by wire 253 to contact arm 222 mounted on insulating block 223 fastened to the top of box 224. Flexible contact arm 225, having cam portion 226, is also fastened to insulating block 223 and is biased to keep the contacts separated normally. Contact arm 225 is connected to terminal B of the battery by wire 227. Therefore, the closing of contacts 222 and 225 causes battery 219 to energize magnet 218. Shielding housing 228 may be placed around magnet 218 and the make-and-break contact and may be made of iron or other metal. It is preferably made of iron in order to confine both magnetic and electrostatic stray fields to the housing. Slot 229 in the housing allows arm 216 passing therethrough to vibrate.

Metal plate 230 is fastened centrally to Bakelite or other insulating rod 231 and is joined to iron rod 232 at 233, by means of threads or otherwise. Iron rod 232 extends to junction 234 at which another Bakelite rod 235 is joined to the iron rod. This composite rod is slidable in a centrally positioned space in solenoid 236 which is suitably fastened to Bakelite bushing 237 at junction 238. Bushing 237 has flange 239 and is threaded into a hole in the left wall of casing 204. The bushing and integral sleeve 240 have a central bore to guide rod 231—232 in sliding movement. Compression spring 241 surrounding rod 231 and pressing against plate 230 and the right end of sleeve 240 normally holds plate 230 in the position shown adjacent plate 212. Stop 242 on rod 235 limits movement of the rod and plate 230 to the right, by striking the left end of solenoid 236.

Plate 212 is electrically connected to flexible switch or relay arm 243 mounted on insulating block 244 which is fastened to the inner surface of casing wall 245 having a hole 246 through which iron armature or plug 247 is movable. This plug is attached to arm 243 and is attracted by magnet 248 when energized to pull arm 243 away from contact 249 which it normally touches. Contact 249 is supported by metal rod 250 fixed in insulator 251 which is fastened in a hole in wall 245. Rod 250 is connected to one terminal of electrical instrument 252 attached to the casing, outside wall 245. The other terminal of the instrument is connected with plate 230 by flexible wire 253. Magnet 248 is connected with conductors 220, and 253 leading from switch arm 222 and battery terminal A to terminals of magnet 218. Instrument 252 may be a ballistic galvanometer, a microammeter, or voltmeter, or the like.

Terminal B of the battery is connected to contact arm 254 by wire 255. Arm 254 is mounted on insulating block 256 fastened to the top of box 224. Flexible contact arm 263 having cam portion 264 is also mounted on insulator 256 and is normally biased to move away from contact 254. When however cam rise 257 strikes portion 264 the contacts are closed so that terminal B of the battery is connected to one terminal of solenoid 236 through wires 255 and 265. The other terminal of the solenoid is connected to battery terminal A by conductor 266. The energization of solenoid 236 causes iron rod 232 and attached plate 230 to be pulled to the left until the plate finally strikes contact 267 connected to ground which may be the casing or the metal framework of the aircraft or both.

Casing 204 is provided with a suitable metal cover which is preferably of iron. Cam 256 having cam rise 257 is fastened to shaft 258 which is rotatable in suitable bearings in box 224 and is driven by a clock-like spring. The rate of rotation of the shaft is govererned by an associated gear train and escapement, as in a clock, and a ratchet can be provided for rewinding the shaft and cam to starting position by means of key 259. The cam is normally held in the starting position shown, against torsion of the spring, by spring catch 260 pivoted to the box top and having catch 261 engaging notch 262 in the cam. The cam may be released for spring-driven clockwise rotation at uniform rate by pulling catch 261 out of the notch.

In operation, conductor 206 is fixed in or on the aircraft so that its length is at right angles to the fore-and-aft axis of the aircraft. It may extend from one wing tip to the other or only part of that distance. Casing 204 is placed in any suitable location, at the end of conductor 206 as shown and key 259 is turned to wind the spring of the timing device including cam 256. The winding is continued until catch 261 engages notch 262. Then as the aircraft flies along, preferably in a straight line, catch 261 is pulled back to release cam 256 which is then rotated clockwise at constant speed so that cam rise 257 strikes cam portion 226 and closes switch 222—225. This causes battery 219 to energize magnets 218 and 248 simultaneously so that switch arm 243 is magnetically pulled away from contact 249 and arm 216 is started vibrating. This arm is normally biased to touch contact 221. The vibration of arm 216 causes metal button 214 to touch, first, contact 209 and then contact 210 alternately at a relatively rapid rate.

Rod 206 is so aligned that, as it is swept through the earth's magnetic field by the flying aircraft, an electron pressure or E. M. F. forcing electrons in conductor 206 toward contact 209 is developed. Therefore each time that metal button 214 touches contact 209 it receives additional electrons from this contact and additional electrons accordingly are transferred to contact 210 connected with plate 212 when button 214 is swung over to touch contact 210. These transferred electrons are then distributed over plate 212 and, due to its relatively large capacitance, it can store a considerable quantity of electrons before its potential or electron density is made so high, in the negative sense, that it will not receive further electrons from button 214. Button 214 need not be normally in contact with element 210 as the momentum of swing will bring it into contact even if normally slightly separated.

In order to supply additional electrons to conductor 206, resilient contact 268 is mounted on insulator 269 and is electrically connected with conductor 206 by wire 270. Therefore after button 214 is moved away from contact 209, grounded metal arm 216 touches flexible contact 268 and conductor 206 is brought to ground potential again. Contact 268 is not essential if conductor 206 is of sufficient volume to supply all the needed electrons without developing excessive positive potential. Button 214 can similarly be grounded after leaving contact 210, if desired.

Switch 243—249 is maintained open while the vibrating button 214 is transferring electrons, which operation continues until the trailing end of cam rise 257 passes cam portion 226 and so switch 222—225 opens again. When that happens magnets 248 and 218 are deenergized so that the vibrator stops after the timed interval, and switch 243—249 is closed, with the result that the excess charge of electrons on plate 212 passes through instrument 252 and into plate 230 which can be grounded if desired but is shown as being insulated. The quantity of electrons accumulated in plate 212, as indicated by their flow through instrument 252, will be a measure of the speed of the aircraft relative to ground, since the timed interval is the same for each test and the electron pressure toward contact 209 will vary in proportion to the speed of the conductor 206 relative to the vertical component of the earth's magnetic field at the location of the speed determination. Variations of the strength or direction of the earth's field can be compensated for as described later.

Resistor 271 can be connected between instrument 252 and plate 230 to make the discharge aperiodic, if desired, or a rectifier can be included in the circuit if instrument 252 is of direct current type.

As the trailing end of cam rise 257 rotates past cam element 226 the forward end of the cam rise strikes cam element 264 to cause closing of switch 263—254. This results in energizing solenoid 236 so that iron rod 232 and connected plate 230 are pulled to the left. This separation will result in a decrease of capacitance of the condenser formed by plates 212 and 230. The plate 230 can be insulated or grounded and, if insulated it can be arranged to strike grounding metal strip 272 when it is near plate 212 so that induced positive charges on plate 230 will be held when the plate is separated from strip or contact 272. Therefore, as plate 230 is moved to the left the voltage rises and can be indicated by instrument 252. When plate 230 finally touches element 267 it is grounded again.

It is not essential that plate 230 be movable but it provides an added effect. The switches 222—225 and 254—263 can be located so that solenoid 236 is energized after the closing of switch 243—249, or before, or simultaneously. Magnet 248 may be shielded, as well as other parts likely to produce stray fields or radiation.

Shielding tube 205 can be removed if desired, but is useful in eliminating or reducing static charges on conductor 206. Plate 212 is grounded after each discharge since connected plate 230 is grounded at least at times. A suitable motor could rotate cam 256 to give rapidly repeated ground speed indications.

Figure 15 shows a modified electrical ground speed indicator. Like parts are given like reference characters as in Figure 14. In this case rotatable disc 216a driven by shielded motor 218a, sweeps contacts first past resilient contact 209a and then past resilient contact 210a. As before, these contacts, the contacts or buttons on disc 216a, and rod 206 and plate 212 are made of the same metal. Disc 216a is made of Bakelite or other electrically insulating material and has imbedded metal buttons 214a extending from one face of the disc to the other at a uniform radius from the center. These buttons are flush with the faces of the disc so that they will make smooth contact with elements 209a and 210a as they pass. The left face of the disc has only the equally spaced metal contact buttons showing through but the right face has also thin metal strips 268a extending radially outward from connected motor shaft 273 which is grounded, the motor 218a being fastened to metal casing 204. The strips 268a are imbedded in the right face of the disc and are flush with the surface. They are situated midway between buttons 214a and extend nearly to the disc edge. Contact or brush 210a is placed so that any button 214a will first brush past contact 209a to collect electrons and then will come into contact with brush 210a to deposit them.

Contact 210a is supported on insulator 274 and is connected to switch arm 275, fastened to insulator 276, by wire 279. Contact arm or switch arm 277 having cam portion 278, is resilient and is normally separated from contact arm 275. Contact arm 277 is connected to plate 212 by wire 280. Wires 279, 280, contact arms 275 and 277 and plate 212 are all made of the same metal of which contacts 209a, 210a and rod 206 are made.

Plate 230a is of the same metal as plate 212, preferably, and is mounted in insulating bars 213a fastened to the casing. Plate 230a is parallel to and adjacent plate 212, and metal plate 281 is also supported in bars 213a, and adjacent plate 230a and parallel thereto as indicated. The negative terminal of battery or other relatively high potential source 282 is connected to plate 281 by wire 283 and the positive terminal of the battery is connected to resilient switch arm 284 by wire 285. Switch arm 284 has a cam portion which is struck at times by cam rise 286 on cam 287a fastened to shaft 258 along with cam 256 but displaced axially therefrom. Switch contact arm 287 is normally separated from contact arm 284 and is electrically connected with plate 230a by wire 288. Therefore when contacts 284 and 287 are momentarily touched together and separated plate 230a is left with a positive charge, i. e., a deficiency of electrons.

Plate 281 can be grounded at the same time that contacts 284—287 are closed, if desired.

Plate 212 is connected to flexible cam switch arm 289 by wire 290. Associated switch arm 291 is normally separated from arm 289 and is electrically connected with cathode 292 of electronic amplifying tube 293 the grid 294 of which is connected to wire 288 and plate 230a by wire 295. If desired, grid bias battery 296 may be connected as shown to bias the grid negatively with respect to cathode 292. If bias battery 296 is used, resistor 297 of relatively high resistance should be connected between wire 295 and wire 298 connecting cathode 292 to switch arm 291. This switch is made as described for the other switches and is also attached to the top of box 224.

Shielded motor 299 is attached to box 224 and has pulley 300 in contact with the circular rim of cam 256. Cam rise 257 is displaced axially so that it will not strike pulley or friction disc 300. When the motor is energized by current from battery 219 it revolves cam disc 256 clockwise, and attached cam rise 257 which closes for a period switches 275—277, and 289—291 in the order named. Likewise cam rise 286 momentarily closes switch 284—287.

Terminal A of current source 219 is connected to one terminal of motor 218a and to one terminal of motors 299 and 320. These motors should be of constant speed type and may be of synchronous design. Terminal B of current source 219 is connected to switch contact 301 which can be connected when desired to conductor 302 connecting the other terminals of motors 218a, 299 and 320, by closing connected switch arm 303.

In this case also, a spring motor could be used to drive the cams but an electric motor is shown so that continuous revolution of the cams can be achieved when desired.

The anode of tube 293 is connected to the positive terminal of battery or other potential source 304 the negative terminal of which is connected to a terminal of instrument 252. The other terminal of this electrical indicating instrument is connected to cathode 292 which is suitably energized.

Instrument 252 is mounted on plate 305 and has pointer 306 rotatable about pivot 307. Arcuate scale 308 is concentric with pivot 307 and is calibrated, preferably, in miles-per-hour ground speed. Arcuate rod 309 of silicon steel, soft iron, or the like is attached to the left end of scale 308 concentric therewith. Similarly arcuate rod 310, of any suitable metal, is attached to the other end of scale 308 concentric therewith. Bearing posts 311 and 312 having holes therethrough extend upward from plate 305 and serve to guide rod 310 and attached scale 308 in an arcuate path. Rod 309 is movable in arcuate solenoid 313 attached to plate 305. Compression spring 314 surrounding rod 310 and pressing against bearing 311 and collar 315 on rod 310, serves normally to urge rod 310 clockwise until collar 316 on rod 310 strikes bearing 311 as a stop.

When solenoid 313 is energized arcuate plunger 309 is magnetically pulled into it against the tension of spring 314 for a distance proportional to the current passing through the solenoid winding. Therefore if current through solenoid 313 is proportional to the effective magnetic field strength of the earth, i. e., the vertical component, then scale 308 will be moved through an arc proportional to the earth's effective field strength. The tension of spring 314, the strength of solenoid 313, and the scale markings of scale 308 can then be so correlated, and with respect to pointer 306 that scale 308 will be properly shifted relative to the pointer to compensate for variations of the earth's effective field strength. Such variations will include changes of magnetic field strength as well as direction. Limited compensation is therefore provided.

In order to vary the current in solenoid 313 in proportion to the effective earth's field, a generator is provided the output of which varies with the effective component of the earth's field. Rectangular windings 317 and 318, consisting of many turns of fine wire, are attached to shaft 319 of motor 320 on opposite sides of the shaft, by means of bands 321 or in any other manner. The shaft may have two opposed flat surfaces. Slip ring 322 is attached to shaft 319 and has an associated brush connected with cathode 328 of electronic amplifying tube 324. Commutator 325 comprises an insulating disc of Bakelite or the like attached concentrically to shaft 319 and carrying small contact plugs 326 and 327 diametrically opposite and imbedded in the disc so that their outer surfaces are concentrically curved and are flush with the edge of the disc.

One terminal of winding 317 is connected to slip ring 322 and the other terminal is connected to contact 327 by a conductor passing through an axial bore in the shaft. Similarly, one terminal of winding 318 is also connected to slip ring 322 and the other terminal of this winding in connected to contact 326. Suitably supported brush 329 makes contact with plugs 326 and 327, alternately, as shaft 319 is revolved by motor 320. Brush 329 is connected with grid 323 through bias battery 330 which can be arranged to bias the grid either negatively or positively but negative biasing is shown.

Winding 317 is fixed to shaft 319 so that the outer leg is at the apex of its circular travel, as indicated, when plug 327 is in contact with brush 327. The coil is phased so that the electromotive force generated by the coil linking the earth's magnetic field is applied to cathode 328 and grid 323 with such polarity that grid 323 is made positive or less negative with respect to the cathode. The result is that current passing through the tube, and solenoid 313 connected in series therewith is increased. The anode of tube 324 is connected to the positive terminal of battery or other potential source 331 the negative terminal of which is connected to cathode 328, with solenoid 313 in series.

Since the E. M. F. generated by rotating winding 317 is effective in the circuit only when in the topmost position shown, when the outer leg is travelling horizontally for a moment, the effective momentary E. M. F. controlling tube 324 is proportional to the vertical component of the magnetic field of the earth at that location. This is still true regardless of the direction of travel or magnetic field strength or direction, for all determinations say north of the equator. The connections from the brushes to the grid and cathode respectively, can be reversed for determinations south of the equator. Even close to the equator there is still a vertical magnetic field component.

As winding 317 is rotated past its vertical position indicated, plug 327 leaves brush 329 and breaks the grid circuit until plug 326 is rotated to a position in contact with brush 329. Winding 318 will then occupy the position shown by winding 317 and is phased to supply the grid circuit with another positive pulse proportional to the vertical component of the earth's magnetic field. Grid leak 332 can be connected between the grid and cathode if desired.

If motor 320 revolves shaft 319 fast enough the rapidly recurring positive pulses will be almost continuous in effect, but a storage condenser can be used if desired. It will be seen therefore that the output current through tube 324 and solenoid 313 will be in proportion to the vertical component of the earth's magnetic field. Scale 308 and the associated parts are calibrated, as previously described, so that the scale will be shifted to compensate for variations of the effective vertical component of the earth's field. If, for instance, pointer 306 is in the same position for a weaker field as for a stronger field it indicates that the aircraft is travelling faster in the weaker field and scale 308 will be shifted clockwise to bring a higher scale reading into register with the pointer.

The device can be calibrated for a weak field or a strong field and the output of the rotating windings can be applied to tube 324 to reduce the current therethrough instead of increasing it as described. In that case scale 308 would be moved clockwise to compensate for stronger fields and it would be calibrated accordingly, in conjunction with pointer 306. While the compensating effect is shown as being accomplished by a scale shift, the output of tube 324 can be applied to the electrical circuits of instrument 252 to effect compensation without moving the scale. One method of accomplishing this is to connect an electronic tube between battery 304 and instrument 252 and then to apply potentials from the anode circuit of tube 324 to the grid circuit of the added tube, in order to change the resistance of the circuit including the instrument. Therefore, considering a constant speed of the aircraft, if the earth's field becomes weaker than the calibrating field, so that instrument 252 might show a lower speed than the actual value, the resistance of the added tube will be correspondingly lowered so that more current will flow through instrument 252 and it will indicate correct ground speed. It can be calibrated to show correct speeds for wide changes of effective field strength. Switch 339 is provided to cut solenoid 313 out of circuit when desired.

Another construction for compensating for variations of the effective component of the earth's field includes solenoid 340, and associated components. This solenoid is connected to wires 341 and 342 leading to cathode 328 and to the negative terminal of battery 331, respectively. Therefore solenoid 340 is energized from tube 324, and simultaneously with solenoid 313 if switch 339 is closed. Solenoid plunger 343, made of soft iron, is suspended by suitably supported spring 344 attached to conductor 345 connected to a terminal of instrument 252. Contact 346 is carried by plunger 343 and is electrically connected with spring 344 and wire 345. This contact is movable along resistor 347 connected to cathode 292. Therefore when plunger 343 is energized contact 346 is moved along resistor 347 so that the resistance in the instrument circuit is increased and the current therethrough is correspondingly reduced. The value of the resistor, and the strengths of solenoid 340 and spring 344 can be so chosen that the device will compensate for variations of field strength. If, for instance, the aircraft flies through a weaker field than the calibrated value, the energizing pulses through solenoid 340 will be weaker and spring 344 will accordingly pull plunger 343 and attached contact 346 in a direction to reduce the resistance and so to increase the current through instrument 252; and vice versa. The inertia of the solenoid plunger will cause it to hold a fairly steady position even though the energization of the solenoid is fluctuating. It is not essential to use solenoid 313 in this case and it can be cut out of the circuit by switch 339.

The various motors and switches described in the foregoing pages are preferably shielded to eliminate interference from stray fields. The conductors likewise should be shielded. Wherever thermoelectric effects or contact potentials might interfere, as for instance in conductors 288 and 290, these should be made of the same metal as all connected components.

In operating, conductor 206 extends across the aircraft as previously described. Shaft 319 is aligned parallel with conductor 206. Now if the aircraft is flying in the northern hemisphere, say, then the grid connections of tube 324 are as shown and switch 303 is closed to start connected motors 218a, 299, and 320 revolving. Assuming that the motors are revolving at their constant speeds, as plugs 214a rub against contact 209a due to rotation of disc 215a in clockwise direction as viewed from the right, each plug will collect electrons from contact 209a due to the electron density developed in that contact as a result of the E. M. F. generated in conductor 206 as it is swept through the vertical component of the earth's magnetic field. At least part of the electrons removed from contact 209a will be transferred to contact 210a as disc 216a carries the plugs further around the circumference to touch contact 210a. The electrons are not transferred to plate 212 however until switch 275—277 is closed by rotating cam rise 257.

Before switch 275—277 is closed, however, cam rise 286 closes switch 284—287 for a moment to leave plate 230a positively charged. This positively charged plate, being adjacent plate 212, tends to increase the capacity of plate 212 to accumulate electrons without developing such a high negative potential that additional electrons will not be transferred from the rotating plugs. A limit will however finally be reached. Contact buttons 214a can, if desired, be grounded momentarily by grounded flexible metal brush 268b. Rod 206 is shown as being grounded intermittently but the extreme right end of this rod can be grounded permanently by connecting it to the metal framework or to shield 205. This construction supplies adequate electrons to rod 206 but reduces its isolation.

Switch 275—277 is then closed by rotating cam rise 257 and is maintained closed for the same time interval each time that cam rise 257 is passing beneath cam element 278. While the switch is closed, therefore, the individual extra electron charges on plugs 214a are transferred to plate 212 through conductors 279 and 280 and switch 275—277. As cam 256 continues to rotate clockwise, cam rise 257 closes switch 289—291 so that electron flow from plate 212 to positively charged plate 230a passes through resistor 297 and biases grid 294 positively. The resulting increase of current through instrument 252 causes pointer 306 to indicate the speed of the aircraft relative to ground. The tube 293 may normally be biased to cut-off, or for a predetermined current which will cause pointer 306 to register a zero reading.

Therefore as the cams revolve and the aircraft flies its course, repeated indications of ground speed are shown by pointer 306 relative to scale 308 and the scale is automatically adjusted, as described, to compensate for variations of the effective vertical component of the earth's magnetic field.

In Figure 17, conductor 206 is carried by an aircraft through the earth's magnetic field as previously described. Rectifier 334, in series with conductor 206 and metal end section 335, permits passage of electrons from conductor 206 to element 335 but not in the reverse direction. Therefore the electron pressure built up in insulated element 335 will be released when switches 336 and 337 are simultaneously closed to join conductor 206 to the left end of element 335 by wire 338 and series-connected instrument 252. The switches can be closed after automatically timed intervals and the redistribution of the electrons will cause an indication by instrument 252 proportional to the ground speed of the aircraft.

In Figure 18, commutator disc 216a is rotated rapidly by motor 218a to cause metal plugs 214a to sweep past brushes 209b and 210b connected, respectively, to rod 206 and one terminal of electrical instrument 252 the other terminal of which is connected to plate 212. Alternate plugs 214a are grounded by wires 214b connecting them to the grounded shaft of motor 218a. Therefore as disc 216a is rotated, an insulated plug 214a suddenly connects contact 209b to contact 210b and the next following contact grounds these contacts and connected plate 212 and conductor 206. When the insulated plugs connect the contacts the concentration of electrons built up at contact 209b, due to movement of conductor 206 through the earth's field, is released to rush toward plate 212, thereby affecting instrument 252. These rapid pulses are therefore indicated by instrument 252 and the magnitude of the indication is a measure of ground speed.

The electrical circuits shown and described have been designed to avoid closed circuits in which generated electromotive forces would cancel.

It is obvious that moving belts and the like can be used to transfer electrical charges, instead of discs or vibrating elements. Likewise, multi-stage amplifiers can be used instead of single tubes as shown.

Magnetic charts showing strength and direction of the earth's magnetic field at various locations, and at various times, can be referred to in order to compensate ground speed indications, if an automatic compensator, as described is not used. The generating coil or coils of the compensator need not be rotated but could be vibrated in order to link the earth's field.

In the gyroscopic type of ground speed indicator the rates of precession of one or more gyroscopes can be used as a measure of ground speed, as well as other variations. As shown in my copending application, Serial No. 61,333 filed November 22, 1948, the plumb bob or pendulum can be manually controlled and set by means of an attached level.

Readings of the resultant scale can be transferred to a dial by means of gears, racks, flexible cables, selsyn motors, or the like. Many other changes, modifications, and substitutions of components or combinations thereof can be easily made without departing from the general principles I have disclosed. For instance, a gyroscope can be attached to plate 1 to keep it aligned parallel with the axis of the earth, another gyroscope can keep this plate aligned with respect to north-south direction; a motor driven timing device can be used to operate the device repeatedly, automatically, including pushing an operating button, then the ground speed and drift determinations can be automatically transferred to a map so that the true course of the aircraft will be recorded, and true distances indicated.

This ground speed and drift indicator, or any previously described, will be of great value in showing military and other aviators just where they are at all times, regardless of winds. The ground speed indications can be combined with a clock so that exact positions can be registered at all times.

What I claim is:

1. The method of determining speed of a vehicle relative to ground, said method comprising, arranging on said vehicle a gyroscope with its axis parallel with the equatorial plane of the earth and determining the apparent rate of rotation of said gyroscope axis relative to said vehicle, arranging on said vehicle another gyroscope with its axis parallel with the axis of the earth and determining the rate of divergence between said other gyroscope axis and a line continually directed toward the center of gravity of the earth, and determining the ground speed of said vehicle as a resultant of said rates.

2. In a ground speed indicator, a first gyroscope having its axis parallel with the equatorial plane of the earth, another gyroscope having its axis parallel with the axis of the earth, first means movable relative to a member of said first gyroscope in proportion to the ground speed of a vehicle carrying said indicator, in a direction parallel with the equatorial plane of the earth; other means movable relative to a member of said other gyroscope in proportion to the ground speed of said vehicle in a direction substantially at right angles to said first named direction, means including timing means for determining the degree of said movement of said first means and said other means within a predetermined period of time, and means for determining ground speed of said vehicle as a resultant of said movements.

3. In a ground speed indicator, gyroscopic means for determining a component of said ground speed in an east or west direction, means including other gyroscopic means for determining a component of said ground speed in a north or south direction, and means for compensating at least one of said determinations in accordance with the approximate latitude at which said determinations are made.

4. In a ground speed indicator, gyroscopic means for determining speed relative to ground of a vehicle carrying said indicator, and means including a scale for aligning an axis of said gyroscopic means substantially parallel to the axis of the earth in accordance with latitude.

5. In a ground speed indicator, first gyroscopic means, means supporting said first gyroscopic means for universal movement, means for locking said gyroscopic means against movement relative to said supporting means, other gyroscopic means, means supporting said other gyroscopic means for universal movement, means for locking said other gyroscopic means against movement relative to the supporting means therefor, and means associated with said gyroscopic means for indicating ground speed.

6. In a ground speed indicator, first gyroscopic means, means supporting said first gyroscopic means for movement relative thereto, means for locking said first gyroscopic means against said relative movement, other movable gyroscopic means, a gravity controlled element associated with said other gyroscopic means, means supporting said gravity controlled element for movement relative to said other gyroscopic means, and means for locking said gravity controlled means and said other gyroscopic means against relative movement.

7. The method of determining speed of a vehicle relative to ground, said method comprising, arranging on said vehicle a gyroscope with its axis substantially parallel with the equatorial plane of the earth and determining the apparent rate of rotation of said gyroscope axis relative to said vehicle, arranging on said vehicle another gyroscope with its axis substantially parallel with the axis of the earth and determining the rate of divergence between said other gyroscope axis and a gravity-controlled reference, and determining the ground speed of said vehicle as a resultant of said rates.

8. The device as set forth in claim 2, and including a support, and means pivoted to said support for supporting said gyroscopes, said means including a weight responsive to gravity.

9. The device as set forth in claim 2, and including a support, means carried by said support and movable in response to gravity, and means for damping the movement of said movable means.

10. The device as set forth in claim 5, said indicating means including a scale for ground speed in generally east or west direction, a scale for ground speed in generally north or south direction, and a scale to indicate true ground speed as the resultant of the indications of the other said scales.

11. The device as set forth in claim 6, said gravity controlled element comprising a pivoted arm and a weight suspended thereby.

12. The device as set forth in claim 6, and including means for damping the movement of said gravity controlled element.

13. The device as set forth in claim 5, and including timing means for operating said locking means simultaneously.

14. The device as set forth in claim 6, and including timing means for operating said locking means simultaneously.

ALBERT G. THOMAS.

REFERENCES CITED

The following references are of record in the file of this patent:

UNITED STATES PATENTS

| Number | Name | Date |
|---|---|---|
| 1,422,224 | Poole | July 11, 1922 |
| 1,632,567 | Simpson | June 14, 1927 |
| 1,836,881 | Sperry | Dec. 15, 1931 |
| 1,930,096 | Henderson | Oct. 10, 1933 |
| 1,933,493 | Chessin | Oct. 31, 1933 |
| 1,950,517 | Rawlings | Mar. 13, 1934 |
| 2,010,191 | Koch | Aug. 6, 1935 |
| 2,044,150 | Carlson | June 16, 1936 |
| 2,046,890 | Young | July 7, 1936 |
| 2,063,764 | Smith | Dec. 8, 1936 |
| 2,262,033 | Moseley | Nov. 11, 1941 |
| 2,266,449 | Ullrich | Dec. 16, 1941 |
| 2,338,536 | Plaut-Carcasson | Jan. 4, 1944 |
| 2,371,626 | Kecskemeti | Mar. 20, 1945 |
| 2,519,422 | Agins | Aug. 22, 1950 |

FOREIGN PATENTS

| Number | Country | Date |
|---|---|---|
| 380,084 | Great Britain | Aug. 30, 1932 |
| 401,339 | Great Britain | Nov. 6, 1933 |